US009449261B2

United States Patent
Yoneda et al.

(10) Patent No.: US 9,449,261 B2
(45) Date of Patent: Sep. 20, 2016

(54) IMAGE FORMING APPARATUS

(71) Applicant: Sharp Kabushiki Kaisha, Osaka (JP)

(72) Inventors: Kazuhisa Yoneda, Osaka (JP); Kyosuke Taka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/682,943

(22) Filed: Nov. 21, 2012

(65) Prior Publication Data

US 2013/0141758 A1 Jun. 6, 2013

(30) Foreign Application Priority Data

Dec. 1, 2011 (JP) .................................. 2011-263218
Mar. 12, 2012 (JP) .................................. 2012-054233

(51) Int. Cl.
*G06K 15/00* (2006.01)
*G03G 15/00* (2006.01)

(52) U.S. Cl.
CPC ....... *G06K 15/4045* (2013.01); *G03G 15/5066* (2013.01); *G03G 2215/00088* (2013.01)

(58) Field of Classification Search
CPC ............... G06F 3/1292; G06F 13/382; G06F 2213/0042; H04N 2201/0055
USPC ....................................................... 358/1.15
See application file for complete search history.

(56) References Cited

U.S. PATENT DOCUMENTS

| 2006/0037084 | A1 | 2/2006 | Brown et al. |
| 2006/0143716 | A1 | 6/2006 | Ikemoto |
| 2007/0030517 | A1 | 2/2007 | Narayanan |
| 2007/0229570 | A1 * | 10/2007 | Ohmiya ........................... 347/19 |
| 2007/0243748 | A1 * | 10/2007 | Kuse .................. G03G 21/1652 439/352 |
| 2008/0117309 | A1 | 5/2008 | Jeon |
| 2008/0147924 | A1 | 6/2008 | Lambert et al. |
| 2009/0180144 | A1 * | 7/2009 | Ito ........................ G03G 15/502 358/1.16 |
| 2010/0035463 | A1 * | 2/2010 | Wang et al. .................. 439/501 |
| 2010/0153643 | A1 | 6/2010 | Kobayashi et al. |

(Continued)

FOREIGN PATENT DOCUMENTS

| CN | 101184135 A | 5/2008 |
| JP | 2000-174527 A | 6/2000 |

(Continued)

OTHER PUBLICATIONS

Lexmark, 3500-4500 Series User's Guide, Mar. 2007.*

(Continued)

*Primary Examiner* — Kent Yip
(74) *Attorney, Agent, or Firm* — Renner, Otto, Boisselle & Sklar, LLP

(57) ABSTRACT

An image forming apparatus includes an operation unit receiving an instruction, and a connecting unit to which a wireless communication unit is detachably attached. The connecting unit is arranged at a bottom surface of a recessed portion formed on a back surface. The recessed portion has such a depth d that an indicator unit indicating a communicating state of a wireless communication unit, arranged on a surface of the wireless communication unit attached to the connecting unit, protrudes from the recessed portion. Thus, the possibility that a USB wireless LAN adaptor is damaged by external force or is erroneously pulled out can be reduced, the communicating state can easily be recognized visually, and thus, the USB wireless LAN adaptor can be used safely.

26 Claims, 22 Drawing Sheets

(56) References Cited

U.S. PATENT DOCUMENTS

| | | |
|---|---|---|
| 2010/0290076 A1 | 11/2010 | Itoh |
| 2011/0075190 A1* | 3/2011 | Manico et al. ............. 358/1.15 |
| 2012/0092724 A1 | 4/2012 | Pettis |

FOREIGN PATENT DOCUMENTS

| | | | |
|---|---|---|---|
| JP | 2007-074622 A | 3/2007 | |
| JP | 2007-301822 | 11/2007 | |
| JP | 2008-193597 A | 8/2008 | |
| JP | 2008-213232 | 9/2008 | |
| JP | 2009-217480 A | 9/2009 | |
| JP | 2010-108066 | 5/2010 | |
| JP | 2010-191165 A | 9/2010 | |
| JP | 2010-268063 A | 11/2010 | |
| JP | 2011-082677 A | 4/2011 | |

OTHER PUBLICATIONS

Epson, PictureMate personal phot lab User's Guide, Mar. 2004.*
Dell, 5130cdn Color Laser Printer User's Guide, Nov. 2009.*
HP, LaserJet P3010 Series Printers User Guide, Apr. 2009.*
Sony, Operating Instructions BDP-S370/BX37, 2010, pp. 8 and 14.*
Oki, MC361/MC561 Basic User Guide, Oct. 2010, Revision 1.0, p. 1-2, 13-15, 122, 141, 277, and 281.*
Non final Office Action dated Mar. 10, 2016 for related U.S. Appl. No. 14/353,248.

* cited by examiner

IMAGE FORMING APPARATUS

CROSS-REFERENCE TO RELATED APPLICATIONS

This nonprovisional application claims priority under 35 U.S.C. §119(a) on Patent Application Nos. 2011-263218 and 2012-054233 filed in Japan on Dec. 1, 2011 and Mar. 12, 2012, respectively, the entire contents of which are hereby incorporated by reference.

BACKGROUND OF THE INVENTION

1. Field of the Invention

The present invention relates to an image forming apparatus having a USB (Universal Serial Bus) port and, more specifically, to an image forming apparatus preventing any damage to or erroneous disconnection of a USB wireless LAN adaptor connected thereto and allowing easy visual confirmation of state of communication of the USB wireless LAN adaptor.

2. Description of the Background Art

As one type of image processing apparatuses as electronic equipment, an image forming apparatus (typically a copy machine) for forming an image on a sheet of recording paper has been introduced to many places of business (companies and offices). In such a place of business, it is a common practice to have an image forming apparatus having a printer function and copy function connected to a network and to share the apparatus by a plurality of users. An MFP (MultiFunction Peripheral) as one type of such image forming apparatuses has a plurality of basic operational modes including a copy mode, a facsimile mode (hereinafter facsimile will be also denoted as FAX), a network compatible printer mode and a scanner mode.

As an interface for connection to a network, the image forming apparatus has, for example, an NIC (Network Interface Card). NIC has a terminal to which a communication cable such as a UTP (Unshielded Twist Pair) cable is connected. Thus, the image forming apparatus is connected to a network. When connected to the network, the image forming apparatus can realize the function of receiving and printing image data from a terminal such as a PC connected to the network, the function of transmitting image data obtained by scanning a document attached to an electronic mail, and the function of FTP-transferring image data to a computer server or the like.

Recently, an environment favorable for wireless network has been developed, since it eliminates the necessity of wiring and enables easy installation of equipment. By way of example, Japanese Patent Laying-Open No. 2008-193597 (hereinafter referred to as '597 Reference) discloses a note type personal computer (PC) allowing attachment of a wireless LAN card for PC on its side surface. Japanese Patent Laying-Open No. 2000-174527 (hereinafter referred to as '527 Reference) discloses a mobile PC having a flexible antenna for wireless communication arranged at an upper left portion of a display screen.

As a device for wireless connection, a small USB adaptor for wireless LAN in accordance with international standard specification such as IEEE802.11 series (hereinafter referred to as USB wireless LAN adaptor) has come to be widely used. A PC or other device having the USB wireless LAN adaptor attached thereto is connectable to a router or to an access point using radio wave in a frequency band of, for example, 2.4 GHz. Further, mutual connectivity between different manufacturers of wireless LAN devices has come to be certified through Wi-Fi, promoting broader use of wireless network connections.

A USB port of a PC or the like is used for connecting various peripheral devices in addition to the wireless LAN adaptor. A USB memory is widely used as a peripheral device allowing USB connection. A USB memory has large capacity, small size and light weight and hence it is highly portable and, in addition, its handling is easy. Therefore, it is used for moving data of large size such as image data to another device.

An image forming apparatus provided with one or more USB ports has been known. In an image forming apparatus having a plurality of USB ports, a USB wireless LAN adaptor is connected to one USB port, so that the apparatus is connected to a network in wireless manner. It is possible for the user to insert a UBS memory to another USB port of the image forming apparatus. The user can input image data to be printed stored in the USB memory to the image forming apparatus, or make a scanned document data stored in the USB memory to be moved to another device.

Japanese Patent Laying-Open No. 2009-217480 (hereinafter referred to as '480 Reference) discloses a system including a USB memory with USB communication interface, having a radio communication function, connected to a PC. When the USB memory with USB communication interface is inserted to the PC, a printer driver and a monitoring tool are installed to the PC in accordance with introduction setting information stored in the USB memory. When a print request is issued by the PC, image data formed by the printer driver is once stored in a storage area of the USB memory with USB communication interface, and thereafter, transmitted in wireless manner to the USB communication interface provided on a printer.

Japanese Patent Laying-Open No. 2010-191165 (hereinafter Referred to as '165 Reference) discloses an image forming apparatus having an electrical component box containing a circuit board for processing signals from wireless LAN, telephone line and a computer, arranged on a side opposite to an operation unit, with an image forming unit positioned in-between. One surface of the electrical component box serves as an interface surface, on which connectors for connection to LAN, USB and telephone line, or connectors for inserting memory card such as an SD card and CF card are arranged. On the left side surface of image forming apparatus, there is a space X, which is continuous to the front surface, to facilitate connection to the connector or connectors on the interface surface from the front side. Therefore, the LAN terminal and the like connected to the interface surface can be visually recognized through the space X, from the front side of image forming apparatus.

When the USB wireless LAN adaptor is connected to a USB port on the front surface of image forming apparatus, the USB wireless LAN adaptor can easily be pulled out. Therefore, it is possible that the user erroneously pulls out the USB wireless LAN adaptor. In that case, communication will be disconnected. Further, since the user operates the image forming apparatus while standing in front of the image forming apparatus, it is possible that the user's body touches or bumps against the USB wireless LAN adaptor and damages the USB wireless LAN adaptor. Further, it is also possible that a user or other person may touch the USB wireless LAN adaptor and damages the USB wireless LAN adaptor when he/she passes in front of the image forming apparatus. The trouble is that, in the conventional image forming apparatus, a USB device such as the USB wireless LAN adaptor is connected to a USB port from which anyone can easily pull out the inserted USB device, and the device is used in such a state, as described above. This problem cannot be solved by any of '597, '527, '480 and '165 References described above.

SUMMARY OF THE INVENTION

In view of the foregoing, it is desirable to provide an image forming apparatus that can reduce possibility of any damage by an external force to a USB wireless LAN adaptor connected thereto and the possibility of erroneous removal of the adaptor, and that allows visual confirmation of state of communication of the USB wireless LAN adaptor.

According to a first aspect, the present invention provides an image forming apparatus, including an operation unit receiving an instruction, an image forming unit forming an image on a sheet of recording paper based on a data signal from an external device, and a connecting unit to which a wireless communication unit can detachably be attached, wherein the connecting unit is arranged at a bottom surface of a recessed portion formed at a back surface opposite to a front surface on which the operation unit is arranged, of the image forming apparatus; and the recessed portion has such a depth that an indicator unit indicating at least one of a connected state and a communicating state of the wireless communication unit, arranged on a surface of the wireless communication unit attached to the connecting unit, protrudes from the recessed portion.

Preferably, the bottom surface of the recessed portion is parallel to the back surface and vertical to the surface of the wireless communication unit, connected to the connecting unit, on which the indicator unit is arranged.

More preferably, the connecting unit is arranged such that the indicator unit of the wireless communication unit when attached is visually recognizable from the side where the recessed portion is arranged.

More preferably, the connecting unit is a USB socket.

Preferably, the indicator unit indicates in different manners a communicating state in which the wireless communication unit is communicating and a state in which the wireless communication is not communicating but usable.

More preferably, the image forming apparatus includes a plurality of the indicator units, and each of the plurality of indicator units provides mutually different indications in the communicating state of the wireless communication unit.

According to a second aspect, the present invention provides an image forming apparatus, including: an operation unit receiving an instruction; a first connecting unit arranged on a front surface where the operation unit is arranged; and a second connecting unit arranged on a back surface opposite to the front surface; wherein the second connecting unit is arranged at a position lower than the first connecting unit; and a wireless communication unit can be attached to the second connecting unit.

Preferably, the first and second connecting units are arranged on opposite sides with respect to the center of the image forming apparatus when viewed from the front surface.

More preferably, the second connecting unit is arranged in a recessed portion formed on the back surface; and the first connecting unit is arranged on a flat surface of the front surface.

More preferably, the first and second connecting units are sockets each having a rectangular opening to which a plug as a connecting unit to an external device of the wireless communication unit is inserted; and the first and second connecting units are arranged such that longer sides of respective rectangular openings extend in directions different from each other.

According to a third aspect, the present invention provides an image forming apparatus, including: a flexible cable having one end connectable to a wireless communication unit; and a connecting unit to which the other end of the flexible cable is connected.

Preferably, the image forming apparatus further includes an operation unit receiving an instruction; wherein the connecting unit is arranged on a back surface opposite to a front surface on which the operation unit is arranged.

More preferably, the flexible cable is kept in a bent shape with one end connected to the wireless communication unit and the other end connected to the connecting unit.

According to the present invention, the wireless communication unit can be attached to a recessed portion formed on a back surface, not reachable by the user operating the image forming apparatus. Therefore, the possibility that the attached wireless communication unit is erroneously pulled out, or the possibility of any damage to the unit can be reduced. Therefore, the wireless communication unit can be used safely. Further, when the wireless communication unit having an indicator unit indicating the state of communication is attached, the indicator unit protrudes from the recessed portion and, therefore, the state of communication can easily be recognized visually.

According to the present invention, the connecting unit on the back surface is positioned lower in height than the connecting unit provided on a flat portion on the front surface. Therefore, the possibility that the attached wireless communication unit is erroneously pulled out, or the possibility of any damage to the unit connected to the connecting unit on the back surface can be reduced. Therefore, the wireless communication unit can be used safely. When the connecting unit on the back surface to which the wireless communication unit is connected is provided as a USB socket arranged with its longer side extending vertically, load bearing characteristic of the connecting unit can be enhanced, and safety of using the wireless communication unit can further be improved. When the wireless communication unit having an indicator unit indicating the state of communication is attached, the state of communication can easily be recognized visually.

According to the present invention, the wireless communication unit is connected by means of a flexible cable provided at the connecting unit on the back surface. Therefore, the possibility that the wireless communication unit is erroneously pulled out, or the possibility of any damage to the unit can be reduced. Therefore, the wireless communication unit can be used safely. Further, when the wireless communication unit having an indicator unit indicating the state of communication is attached, the state of bending of the flexible cable may be changed, to enable easy visual recognition of the state of communication.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
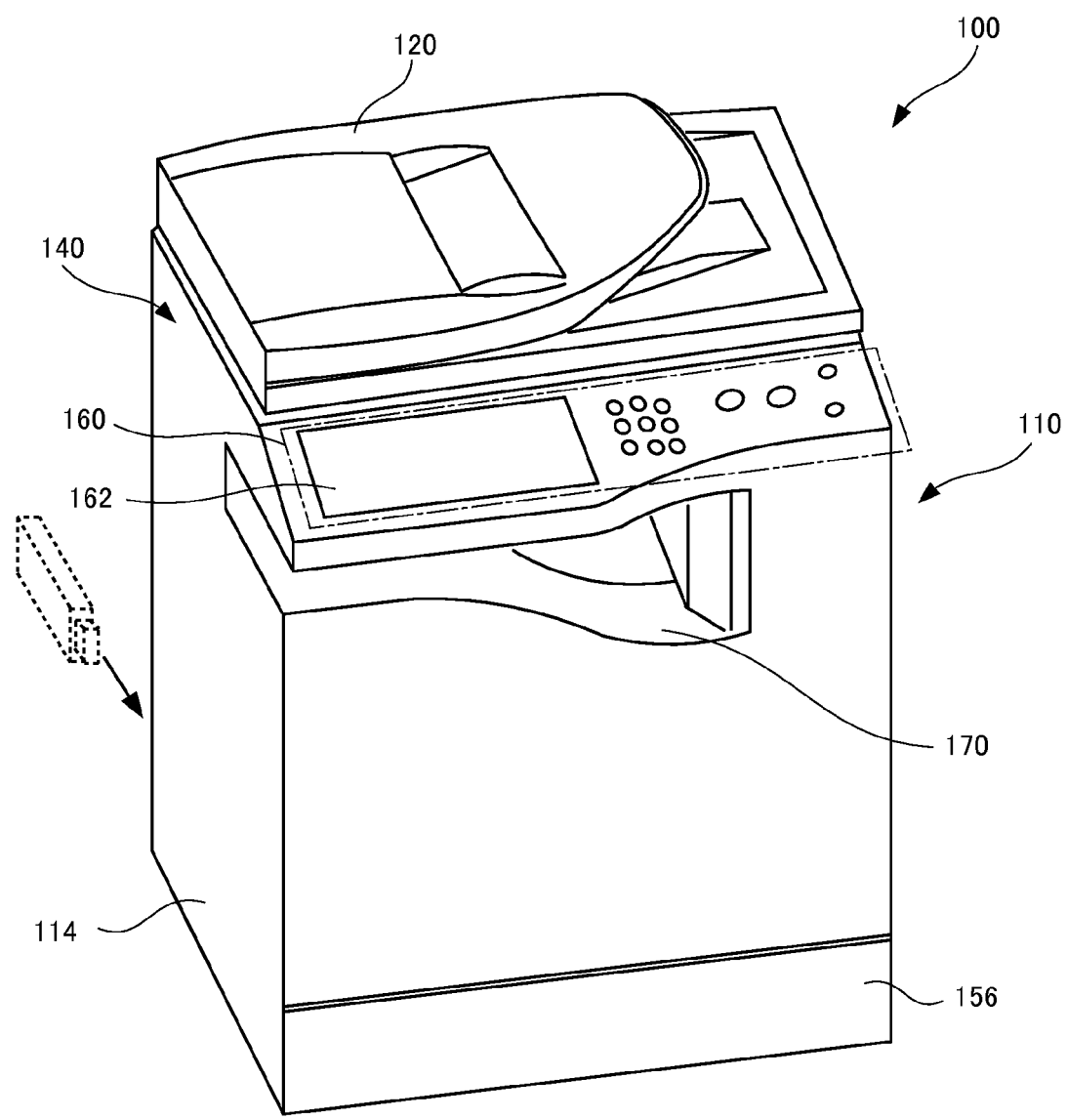
FIG. 1 is a perspective view showing an image forming apparatus in accordance with a first embodiment of the present invention.

In the following embodiments, the same components are denoted by the same reference characters. Their names and functions are also the same. Therefore, detailed description thereof will not be repeated.

First Embodiment

Figure 2:
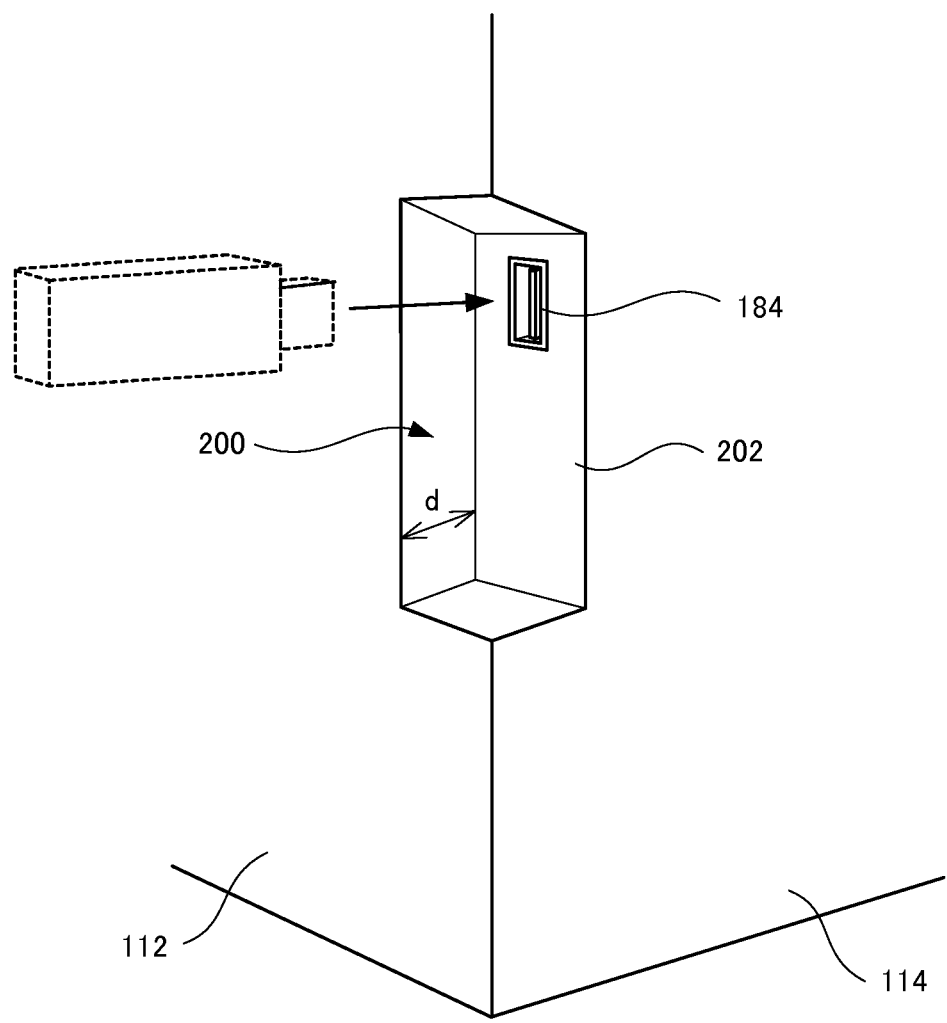
FIG. 2 is a perspective view showing an example of the recessed portion formed on the back surface of the image forming apparatus in accordance with the first embodiment of the present invention.

Referring to FIGS. 1 and 2, an image forming apparatus 100 in accordance with a first embodiment of the present invention forms a multi-colored or monochrome image on a prescribed sheet of recording paper, in accordance with image data formed by reading a document. Image forming apparatus 100 consists of an apparatus main body 110 and an automatic document feeder 120.

An image reading unit 140 is arranged at an upper (inner) portion of apparatus main body 110. Image reading unit 140 scans a document fed by automatic document feeder 120, and produces image data. At an upper portion of apparatus main body 110, an operation unit 160 is arranged. Image forming apparatus 100 executes a process in accordance with an instruction input through operation unit 160. At a lower portion of apparatus main body 110, a paper feed unit 156 holding sheets of recording paper for forming images is arranged. Image forming apparatus 100 draws out a sheet of recording paper from paper feed unit 156, forms an image on a surface of the sheet, and discharges the sheet of recording paper on which the image is formed to an inner paper discharge tray 170.

On a back surface 112 of apparatus main body 110, a USB socket 184 is provided. Here, the "back surface" refers to a surface opposite to the "front surface," on which operation unit 160 is arranged (the surface to which the user faces when operating operation unit 160) of image forming apparatus 100. Specifically, USB socket 184 is arranged at a bottom surface 202 of a recessed portion 200 formed at a corner formed by a left side surface (left side surface when image forming apparatus 100 is viewed from the front side) 114 and the back surface 112. Bottom surface 202 is parallel to back surface 112 and spaced apart by a distance (depth) d from back surface 112. USB socket 184 to which a plug of a USB device is inserted has a rectangular shape, and USB socket 184 is arranged with its longer side extending in the vertical direction (direction of gravitational force). Though not shown, another socket (such as a connector for connecting a communication cable) may be arranged on the bottom surface. In FIGS. 1 and 2, a USB device that can be inserted to USB socket 184 is shown in dotted lines.

Figure 3:
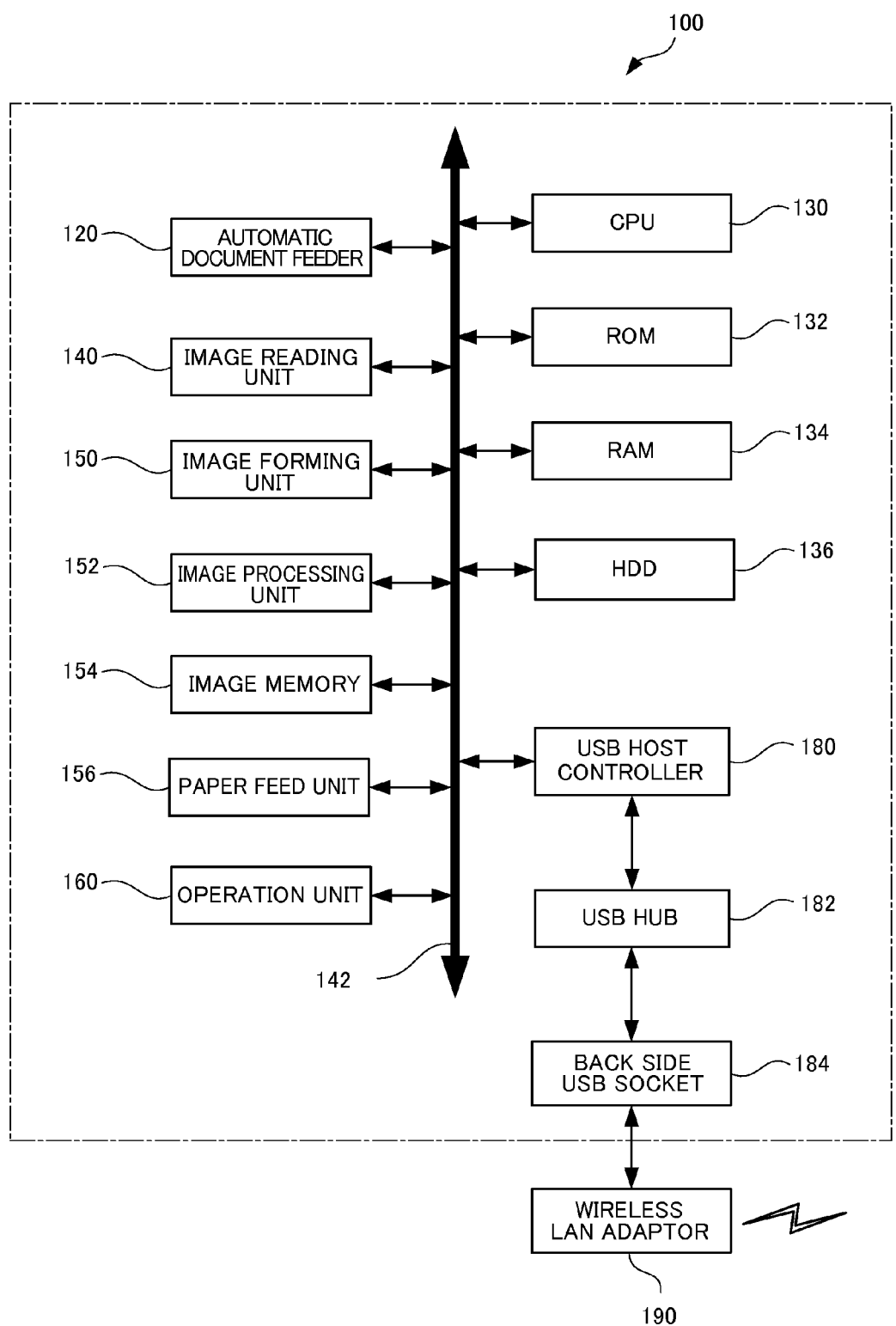
FIG. 3 is a block diagram showing a schematic configuration of the image forming apparatus in accordance with the first embodiment of the present invention.

Referring to FIG. 3, image forming apparatus 100 includes: a control unit (hereinafter referred to as a CPU (Central Processing Unit)) 130 for overall control of image forming apparatus 100; an ROM (Read Only Memory) 132; an RAM (Random Access Memory) 134; an HDD (Hard Disk Drive) 136; and a bus 142. ROM 132 is a non-volatile storage device that retains data even when power is turned off. ROM 132 stores programs and data necessary for controlling operations of image forming apparatus 100. RAM 134 is a volatile storage device. HDD 136 is a non-volatile storage device.

CPU 130, ROM 132, RAM 134 and HDD 136 are connected to bus 142. Data (including control information) is exchanged between each of these components through bus 142. CPU 130 reads a program from ROM 132 to RAM 134 through bus 142, and executes the program, using a part of RAM 134 as a work area. Specifically, CPU 130 controls various units and components forming image forming apparatus 100 in accordance with the program stored in ROM 132, and realizes various functions of image forming apparatus 100.

Image forming apparatus 100 includes, in addition to automatic document feeder 120, image reading unit 140, paper feed unit 156, operation unit 160, inner paper discharge tray 170 and USB socket 184 described above, an image forming unit 150, an image processing unit 152, an image memory 154, a USB host controller 180 and a USB hub 182. These components (except for USB hub 182) are also connected to bus 142. Similar to a common image forming apparatus, image forming apparatus 100 may also include an NIC for connecting to a network using a communication cable as well as a FAX communication modem.

Operation unit 160 receives inputs such as an instruction by the user to image forming apparatus 100. Operation unit 160 includes an operation panel 162 and an operation key portion (area other than operation panel 162 of operation unit 160). The operation panel 162 includes a display panel formed, for example, by a liquid crystal panel, and a touch-panel arranged on the display panel, allowing detection of a touched position. In order to operate image forming apparatus 100, soft keys are displayed on the display panel, and on the operation key portion, hard keys are arranged. CPU 130 monitors user operation of these keys. The user can input an instruction of image formation, setting of conditions for image formation and the like to image forming apparatus 100, by pressing or touching these keys. Selection of a key displayed on the display panel is done by touching the corresponding portion of the touch-panel superposed on the display panel.

When the user operates operation unit 160 and instructs image formation, document is read by image reading unit 140 and the image data generated from the read document is temporarily stored in image memory 154. Image processing unit 152 executes various image processing operations on the image data stored in image memory 154. The image data is stored in HDD 136 as needed.

Paper feed unit 156 includes paper feed cassettes and holds sheets of recording paper for image formation. Image forming unit 150 includes a photoreceptor drum, a charger, an optical scanning device, a developer, a transfer roller and a fixing unit. Image forming unit 150 forms image data read from image memory 154 or from HDD 136 on a sheet of recording paper fed from paper feed unit 156.

USB host controller 180, USB hub 182 and USB socket 184 are connected in a known form of USB connection (multi-star topology). USB host controller 180 is also a highest level root hub. A known series A plug is connected to USB socket 184.

Figure 4:
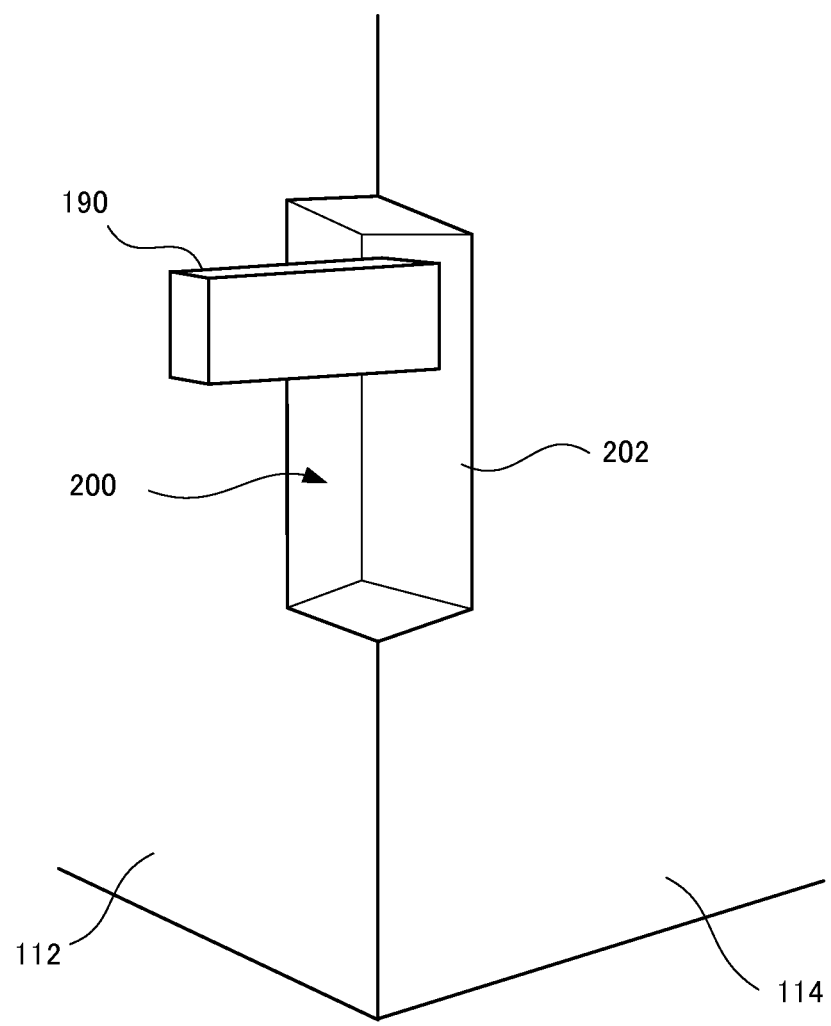
FIG. 4 is a perspective view showing a USB wireless LAN adaptor attached to the image forming apparatus in accordance with the first embodiment of the present invention.

As shown in FIG. 4, when USB wireless LAN adaptor 190 is attached to USB socket 184 of image forming apparatus 100, CPU 130 controls USB host controller 180 and obtains necessary information (USB descriptor) from USB wireless LAN adaptor 190. CPU 130 loads a necessary device driver based on the obtained information. Specifically, CPU 130 reads the corresponding device driver from HDD 136 to RAM 134, and thereby sets USB wireless LAN adaptor 190 to a usable state. The device driver is a low level software program necessary for an OS (Operating System) to control hardware. Communication for obtaining prescribed information from USB wireless LAN adaptor 190 is executed in accordance with a known USB standard. Thus, image forming apparatus 100 becomes connectable to a network through USB wireless LAN adaptor 190.

For image forming apparatus 100 to actually access a network by wireless communication through USB wireless LAN adaptor 190, it is necessary to connect to a prescribed connection destination (a router, an access point or the like). It is possible for the user (including an administrator, a service person and the like) to designate the connection destination by directly inputting an IP address of the destination through operation unit 160. Alternatively, image forming apparatus 100 may automatically detect connectable destinations and display the detected destinations in the form of a list on operation panel 162, and the user may select one from the list.

As USB wireless LAN adaptor 190 attains to the usable state, it becomes possible for image forming apparatus 100 to realize the function of receiving and printing image data from an external terminal such as an external PC, the function of transmitting image data obtained by scanning a document attached to an electronic mail, and the function of FTP-transferring image data to a computer server or the like. USB wireless LAN adaptor 190 is attached not on the front surface on which operation unit 160 is arranged but to recessed portion 200 of back surface 112, to which the user's hand operating image forming apparatus 100 does not reach. Therefore, possibility of the user erroneously pulling out the adaptor is very low. Further, typically, image forming apparatus 100 is placed with its back surface positioned close to a wall or the like, and the users do not pass behind back surface 112. Therefore, possibility of any damage to USB wireless LAN adaptor 190 is very low. Thus, USB wireless LAN adaptor 190 can be used safely.

Further, as shown in FIGS. 2 and 4, recessed portion 200 is formed at the corner formed by back surface 112 and left side surface 114. Therefore, the user can easily confirm, visually, the state of attachment of USB wireless LAN adaptor 190 to USB socket 184. The side surface of USB wireless LAN adaptor 190 can also be visually recognized easily. Therefore, if an indicator unit (LED or the like) indicating the connected state and/or communicating state is arranged on the side surface of USB wireless LAN adaptor 190, the user can visually recognize the state of communication easily. Here, the connected state means a state that USB wireless LAN adaptor 190 is attached to USB socket 184 and the device driver is loaded, so that USB wireless LAN adaptor 190 is usable. The communicating state means that USB wireless LAN adaptor 190 is in the usable state and USB wireless LAN adaptor 190 is communicating with an external device in wireless manner.

Figure 5:
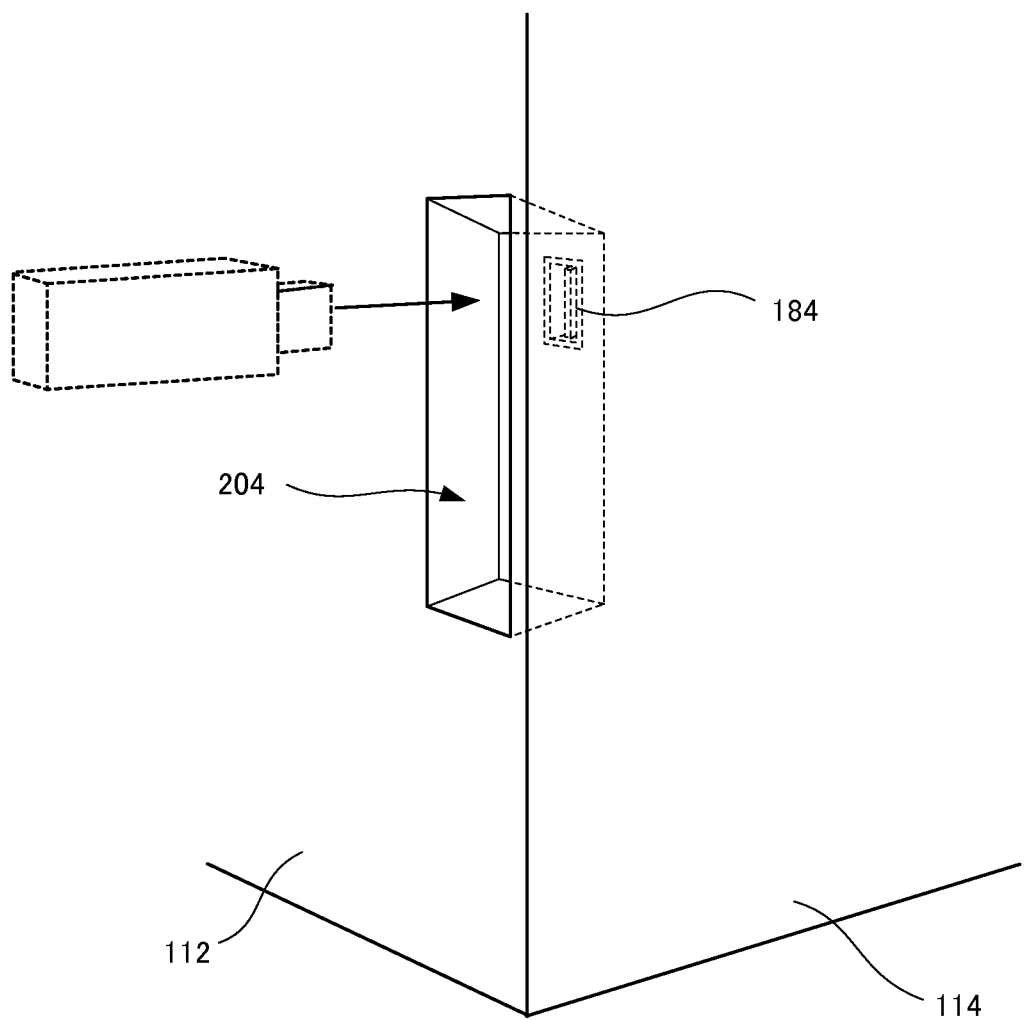
FIG. 5 is a perspective view showing an example, different from the one shown in FIG. 2, of the recessed portion formed on the back surface of the image forming apparatus in accordance with the first embodiment of the present invention.
Figure 6:
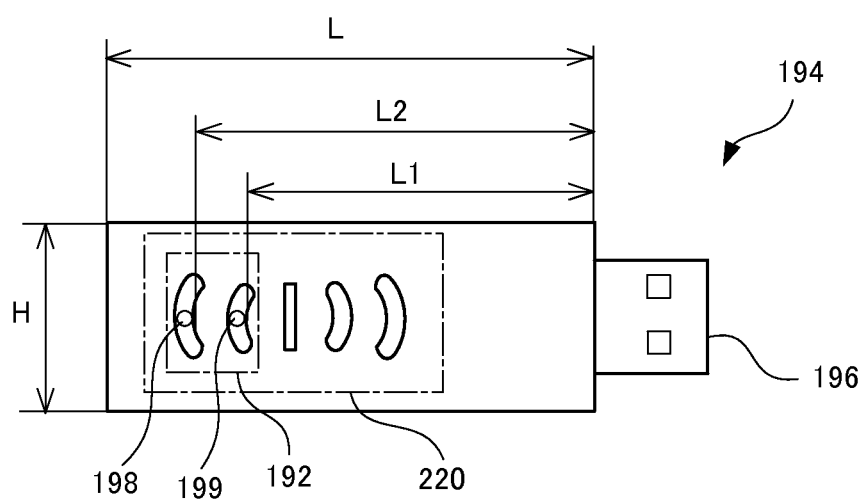
FIG. 6 is a side view showing an example of the USB wireless LAN adaptor.
Figure 7:
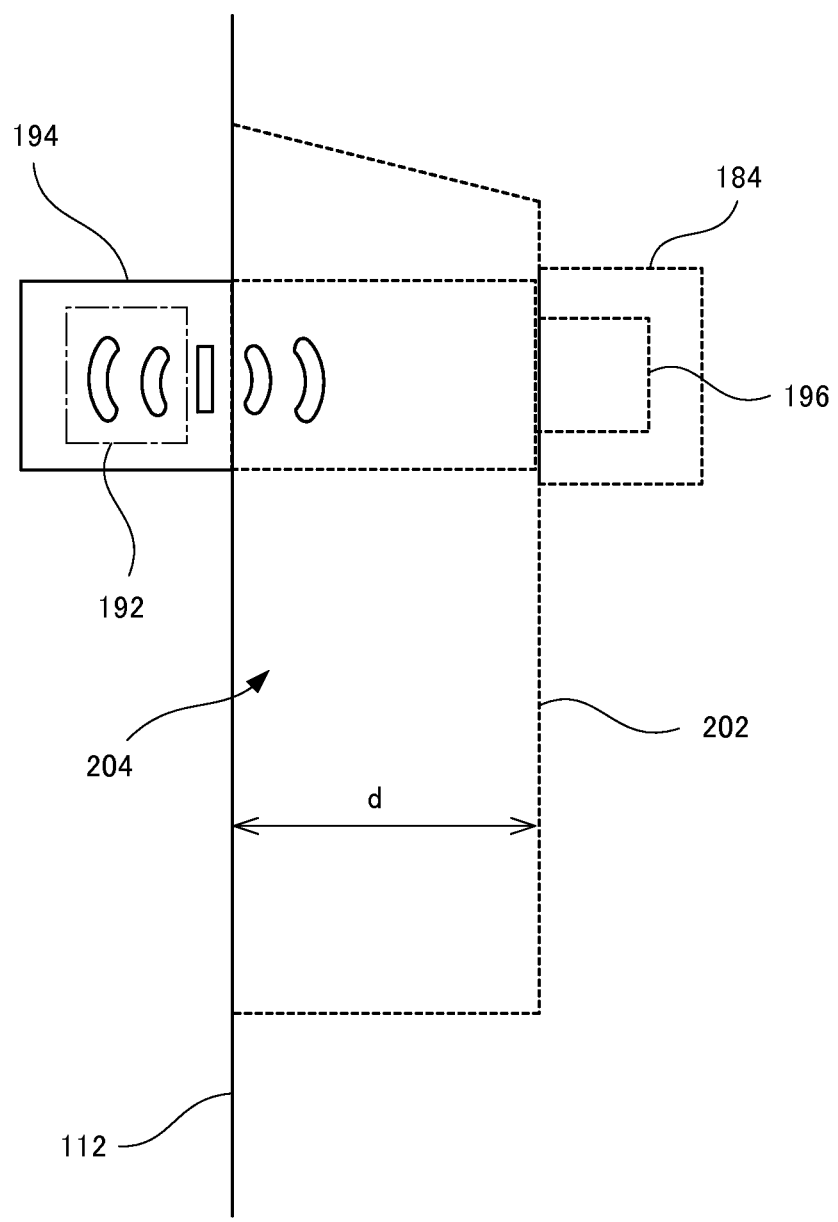
FIG. 7 is a side view showing the USB wireless LAN adaptor of FIG. 6 attached to the image forming apparatus.

The position where the recessed portion is formed is not limited to the corner formed by back surface 112 and left side surface 114. The recessed portion may be formed on at least one of the left side peripheral edge portion and the right side peripheral edge portion of back surface 112. The "left side peripheral edge portion" of back surface 112 means the corner formed by back surface 112 and left side surface 114 as well as a back surface portion near the left side surface 114. The "right side peripheral edge portion" of back surface 112 means the corner formed by back surface 112 and right side surface as well as a back surface portion near the right side surface. By way of example, as shown in FIG. 5, USB socket 184 may be arranged in a recessed portion 204 formed on back surface 112 near the left side surface 114. In FIG. 5, left side surface 114 forms a sidewall of recessed portion 204 and, therefore, different from FIGS. 2 and 4, USB socket 184 cannot directly be recognized visually from the left side. If a USB wireless LAN adaptor 194 having an indicator unit 192 indicating the connected state and the communicating state provided on a side surface such as shown in FIG. 6 is used, for example, the indicator unit 192 in the communicating state can easily be visually recognized when USB wireless LAN adaptor 194 is attached, by appropriately designing the depth d of recessed portion 204.

On a surface of USB wireless LAN adaptor 194, a design 220 indicating that it is a communication device is provided. Design 220 may be formed by molding (injection molding) or printing (silkscreen printing or the like). A sticker having design 220 printed thereon may be attached to the surface of USB wireless LAN adaptor 194. At the center of design 220, a segment representing an antenna is placed, and on both sides thereof, a plurality of arcs representing radio waves are arranged. Near the central portion of two arcs arranged close to the end portion opposite to USB plug 196 among the arcs, LEDs 198 and 199 are arranged. If design 220 is formed with protrusions and indents by molding, the design also serves to prevent slippage. Further, by providing a design with protrusions and indents only on one surface of USB wireless LAN adaptor 194, the user can easily know from the touch of his/her hand the accurate direction of inserting USB wireless LAN adaptor 194 to USB socket 184.

LEDs 198 and 199 indicate the connected state or communicating state of USB wireless LAN adaptor 194 by lighting or flickering. By way of example, in a standby state (not communicating) in which USB wireless LAN adaptor 194 is usable, LEDs 198 and 199 are both lit on. When USB wireless LAN adaptor 194 is communicating, LEDs 198 and 199 both flicker. Here, the rate of flickering of LED 198 is faster (the period of flickering is shorter) than that of LED 199. Thus, visual recognition of communicating state is further facilitated.

The indicator unit indicating the connected state and/or communicating state may be implemented by a light emitting device other than LEDs. Notice of the state by the indicator unit is not limited to notice by lighting or flickering, and it may be given using, for example, different colors.

Depth d is about 20 mm to about 35 mm. The dimension of USB wireless LAN adaptor 194 shown in FIG. 6 is, by way of example, as follows: body length L is about 60 mm, height H is about 20 mm, thickness is about 10 mm, L1 is about 40 mm and L2 is about 50 mm. If the depth d is in the range mentioned above, indicator unit 192 protrudes from the recessed portion.

Figure 8:
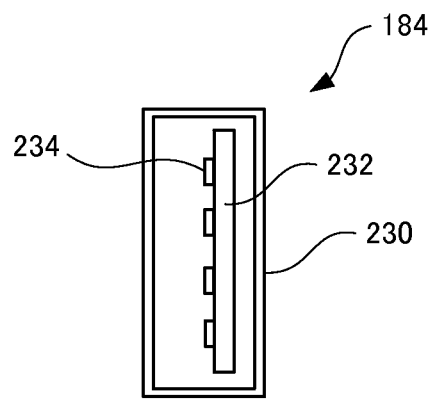
FIG. 8 is a front view showing a USB socket.

If USB wireless LAN adaptor 194 having indicator unit 192 for indicating the communicating state provided only on one side is used, the direction of USB socket 184 should preferably be determined in accordance with the direction of the plug of USB wireless LAN adaptor 194 and the position of recessed portion such that indicator unit 192 of USB wireless LAN adaptor 194 when attached to USB socket 184 can be visually recognized easily. The reason for this is as follows. USB socket 184 has such a shape as shown in FIG. 8, and if the arrangement of USB socket 184 is determined, the direction in which a USB plug is inserted is determined uniquely. Inside a case 230 of USB socket 184, a substrate 232 is placed, and four terminals (a power supply terminal, a ground terminal, a +Data terminal and a −Data terminal) 234 are arranged on one surface of substrate 232.

If the recessed portion is formed at the left peripheral edge portion of back surface 112, it is preferred that the direction of USB socket 184 is determined such that indicator unit 192 of USB wireless LAN adaptor 194 can be visually recognized from the side of left side surface 114 of the image forming apparatus. If the recessed portion is formed at the right peripheral edge portion of back surface 112, it is preferred that the direction of USB socket 184 is determined such that indicator unit 192 of USB wireless LAN adaptor 194 can be visually recognized from the side of right side surface of the image forming apparatus.

Second Embodiment

Figure 9:
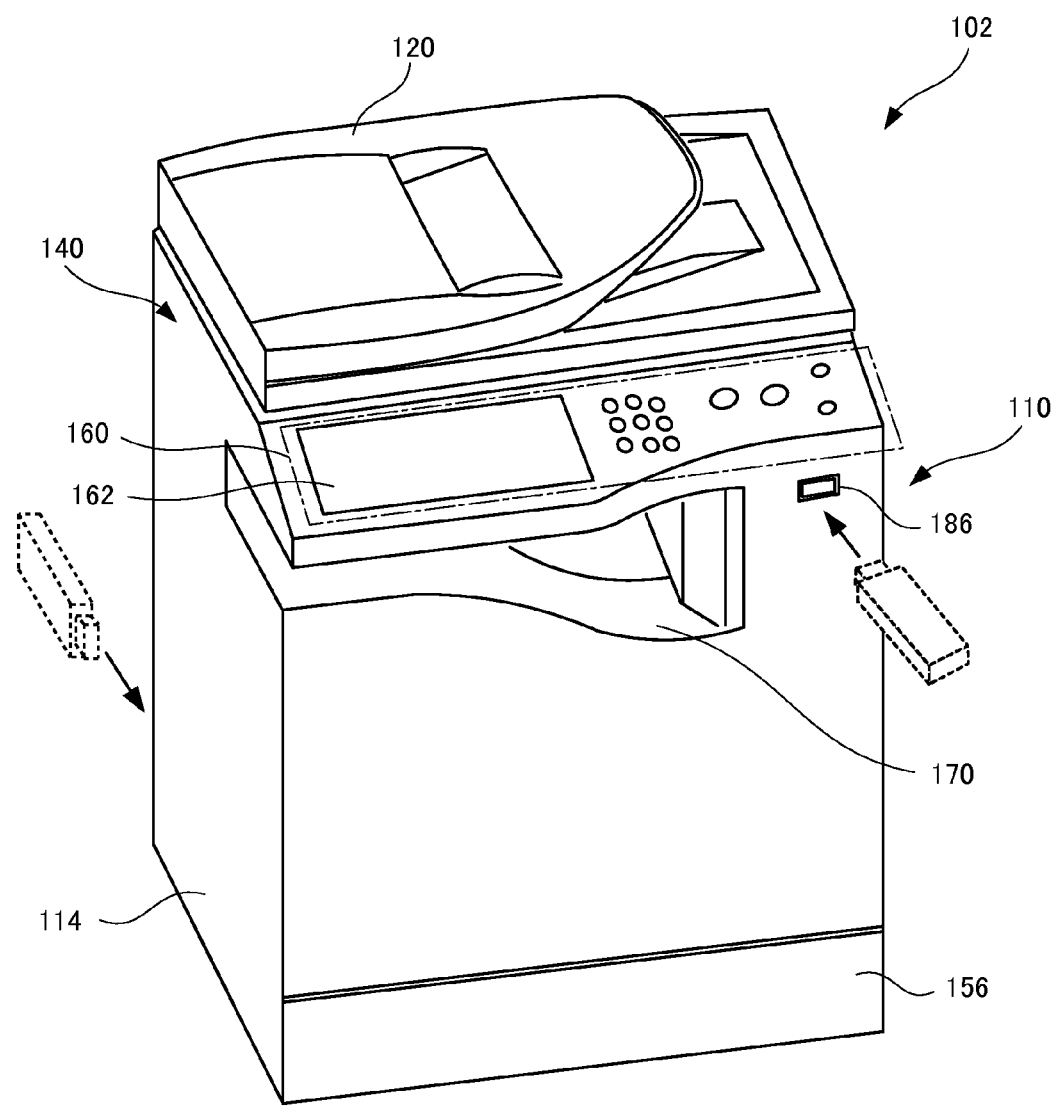
FIG. 9 is a perspective view showing an image forming apparatus in accordance with a second embodiment of the present invention.
Figure 10:
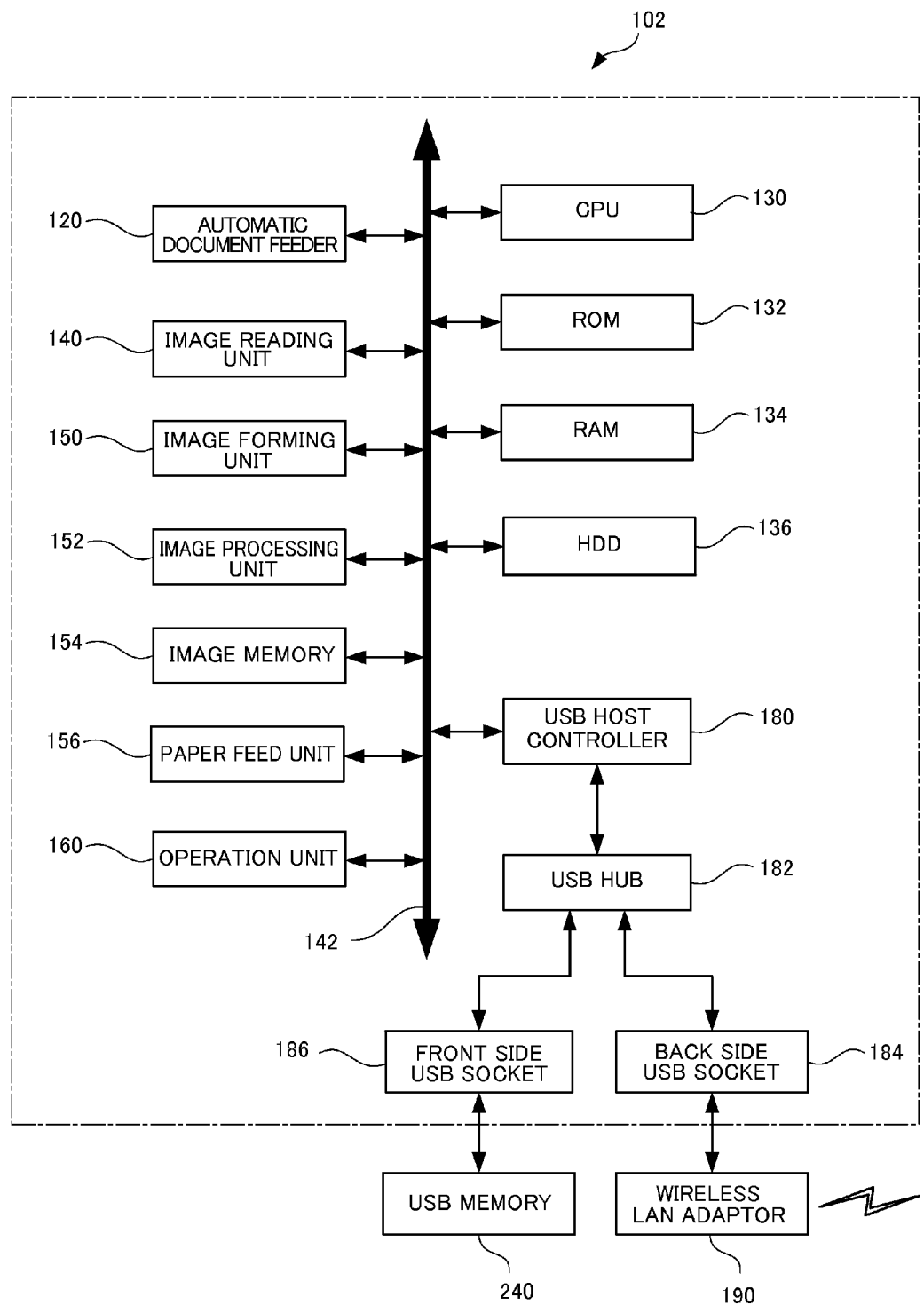
FIG. 10 is a block diagram showing a schematic configuration of the image forming apparatus in accordance with a second embodiment of the present invention.

Referring to FIGS. 9 and 10, an image forming apparatus 102 in accordance with a second embodiment of the present invention forms a multi-colored or monochrome image on a prescribed sheet of recording paper in accordance with image data formed by reading a document. Image forming apparatus 102 consists of an apparatus main body 110 and an automatic document feeder 120.

Apparatus main body 110 and automatic document feeder 120 are configured in the similar manner as in the first embodiment, and have similar functions. Image forming apparatus 102 of the second embodiment differs from image forming apparatus 100 in accordance with the first embodiment in that it additionally has a USB socket on the front surface of apparatus main body 110. Similar to USB socket 184 arranged on the back surface (hereinafter also simply referred to as "back side USB socket"), USB socket 186 provided on the front surface (hereinafter also referred to as "front side USB socket") is connected to USB hub 182. Both back side USB socket 184 and front side USB socket 186 are sockets to which a known series A plug is connected.

Figure 11:
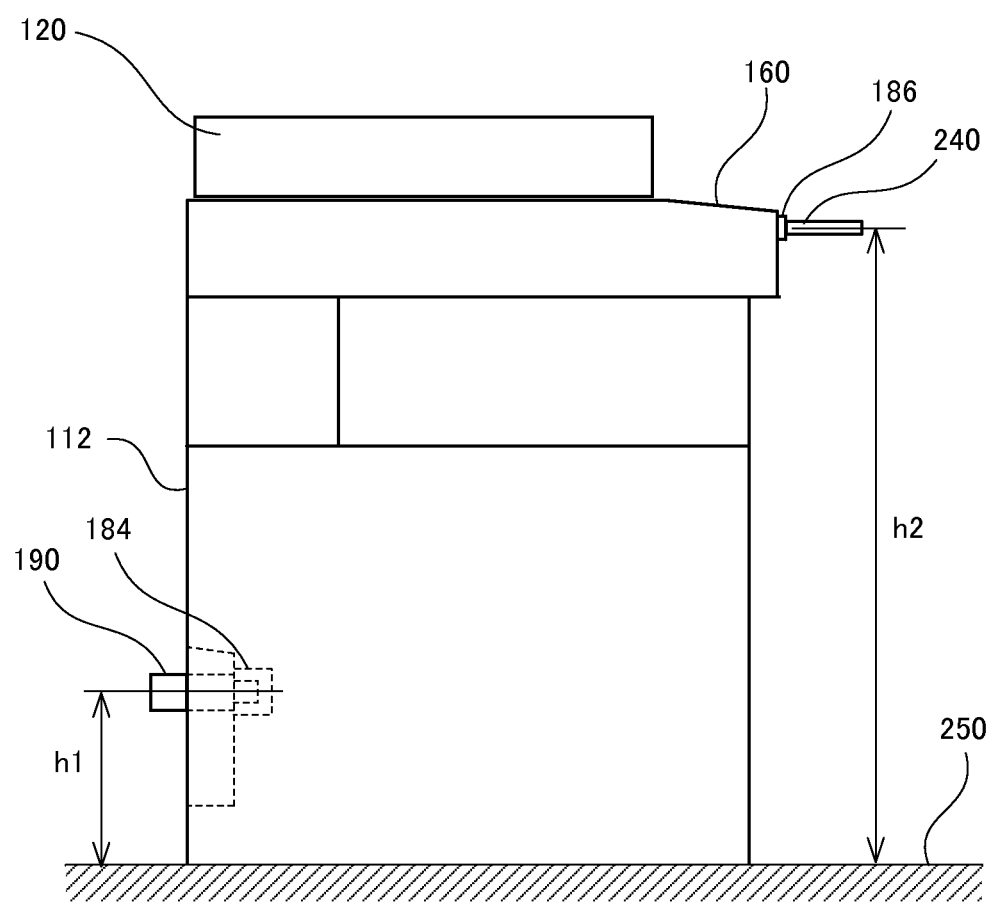
FIG. 11 is a side view showing a USB wireless LAN adaptor and a USB memory attached to the image forming apparatus in accordance with a second embodiment of the present invention.
Figure 12:
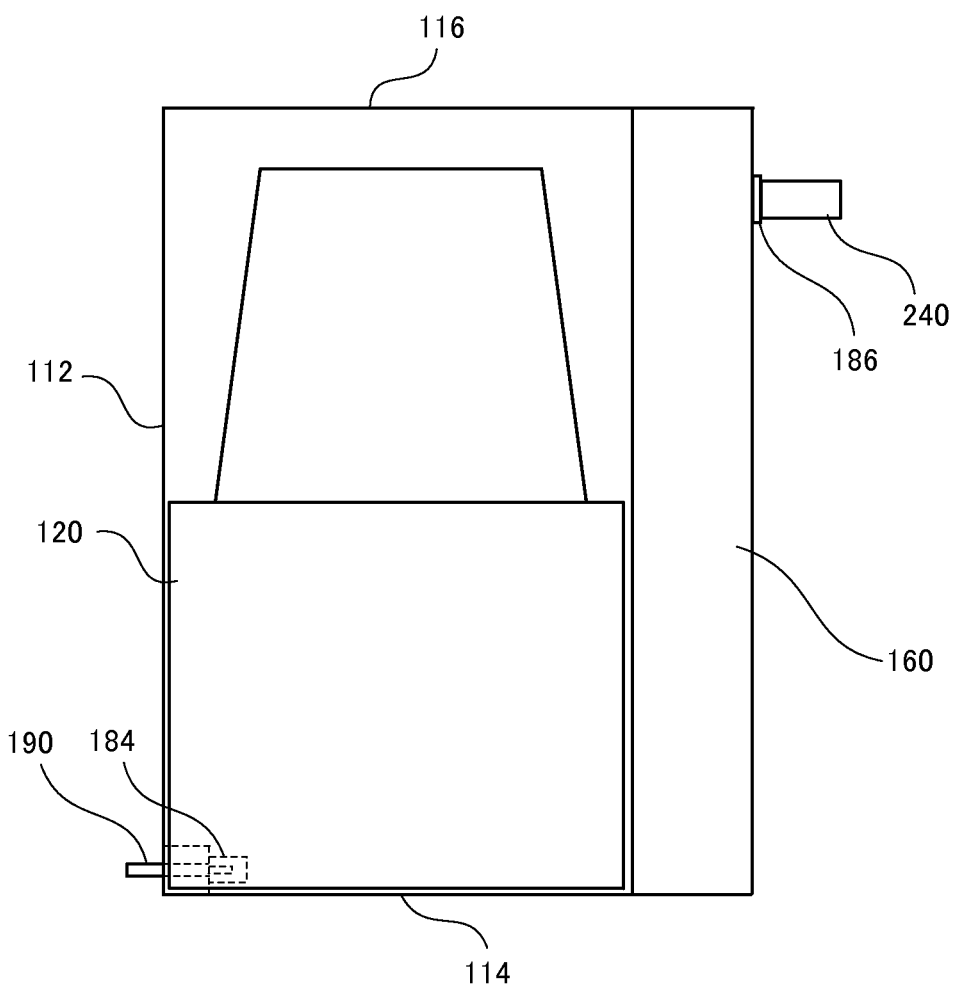
FIG. 12 is a plan view showing a USB wireless LAN adaptor and a USB memory attached to the image forming apparatus in accordance with a second embodiment of the present invention.

FIGS. 11 and 12 show image forming apparatus 102 having a USB memory 240 attached to front side USB socket 186 and USB wireless LAN adaptor 190 attached to back side USB socket 184. When USB wireless LAN adaptor 190 is attached to back side USB socket 184 of image forming apparatus 102, as in the first embodiment, CPU 130 controls USB host controller 180 and obtains necessary information (USB descriptor) from USB wireless LAN adaptor 190. Based on the obtained information, CPU 130 loads a necessary device driver, so that USB wireless LAN adaptor 190 is set to a usable state. Communication for obtaining prescribed information from USB wireless LAN adaptor 190 is executed in accordance with known USB standard. Thus, image forming apparatus 102 becomes connectable to a network through USB wireless LAN adaptor 190.

For image forming apparatus 102 to actually access a network by wireless communication through USB wireless LAN adaptor 190, it is necessary to connect to a prescribed connection destination (a router, an access point or the like). It is possible for the user (including an administrator, a service person and the like) to designate the connection destination by directly inputting an IP address of the destination through operation unit 160. Alternatively, image forming apparatus 102 may automatically detect connectable destinations and display the detected destinations in the form of a list on operation panel 162, and the user may select one from the list.

By USB wireless LAN adaptor 190, it becomes possible for image forming apparatus 102 to realize the function of receiving and printing image data from an external terminal such as an external PC, the function of transmitting image data obtained by scanning a document attached to an electronic mail, and the function of FTP-transferring image data to a computer server or the like.

When USB memory 240 is attached to front side USB socket 186, CPU 130 controls USB host controller 180 and obtains necessary information from USB memory 240 and loads a necessary device driver, so that USB memory 240 is set to a usable state. Thus, it becomes possible for image forming apparatus 102 to access USB memory 240. As access to USB memory 240 becomes possible, it becomes possible for image forming apparatus 102 to realize the function of reading and printing or FAX-transmitting image data stored in USB memory 240, and a function of storing image data obtained by scanning a document or image data stored in HDD 136 to USB memory 240.

As shown in FIG. 11 (left side view), the height h1 of back side USB socket 184 from the floor surface 250 is lower than the height h2 of front side USB socket 186 from the floor surface 250 (h1<h2). Since back side USB socket 184 is arranged at a position difficult for the user to operate, the possibility that USB wireless LAN adaptor 190 attached to back side USB socket 184 is erroneously pulled out or damaged is further decreased. On the other hand, front side USB socket 186 is arranged at a position easy to operate for the user operating operation unit 160. Therefore, the user can easily attach/detach USB memory 240 while he/she is standing in front of operation unit 160.

As shown in FIG. 12 (plan view), back side USB socket 184 and front side USB socket 186 are arranged at diagonal positions. Specifically, back side USB socket 184 is arranged near left side surface 114, and front side USB socket 186 is arranged near a right side surface 116.

With this arrangement, USB wireless LAN adaptor 190 attached to back side USB socket 184 is away from the dominant hand of a right-handed user. Therefore, the possibility that USB wireless LAN adaptor 190 attached to back side USB socket 184 is erroneously pulled out or damaged is further decreased. On the other hand, the USB memory attached to front side USB socket 186 is positioned near the dominant hand of a right-handed user. Therefore, the right-handed user can more easily attach/detach the USB memory while he/she is standing in front of operation unit 160.

Figure 13:
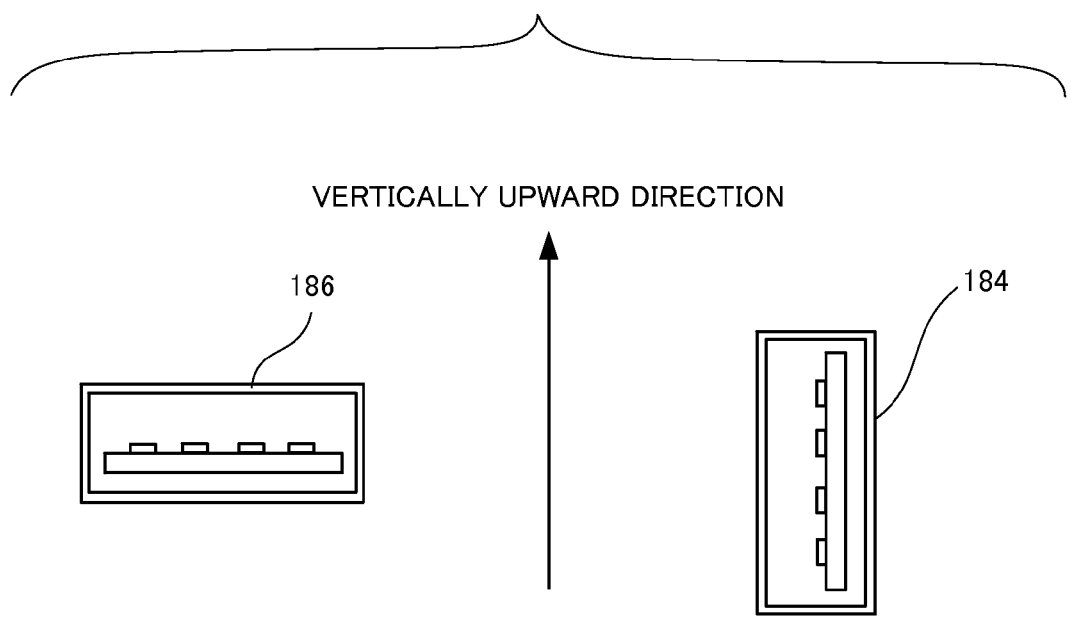
FIG. 13 is a front view showing the directions of arranging a front side USB socket and a back side USB socket of the image forming apparatus in accordance with the second embodiment of the present invention.

Referring to FIG. 13, in image forming apparatus 102, front side USB socket 186 is arranged with a longer side of rectangle arranged along the horizontal direction (direction perpendicular to the direction of gravitational force). On the other hand, back side USB socket 184 is arranged with a longer side of rectangle arranged along the vertical direction (direction of gravitational force). Since back side USB socket 184 and front side USB socket 186 are arranged in different directions, it becomes easier to distinguish USB devices to be connected from each other, and the possibility of erroneously attaching USB wireless LAN adaptor 190 to front side USB socket 186 can be reduced. Further, by such an arrangement, load bearing characteristic of back side USB socket 184 becomes higher than that of front side USB socket 186. Therefore, USB wireless LAN adaptor 190 can be used with higher safety. Further, if USB wireless LAN adaptor 194 having indicator unit 192 for indicating the communicating state as shown in FIG. 6 is attached, the communicating state can be visually recognized easily.

Figure 14:
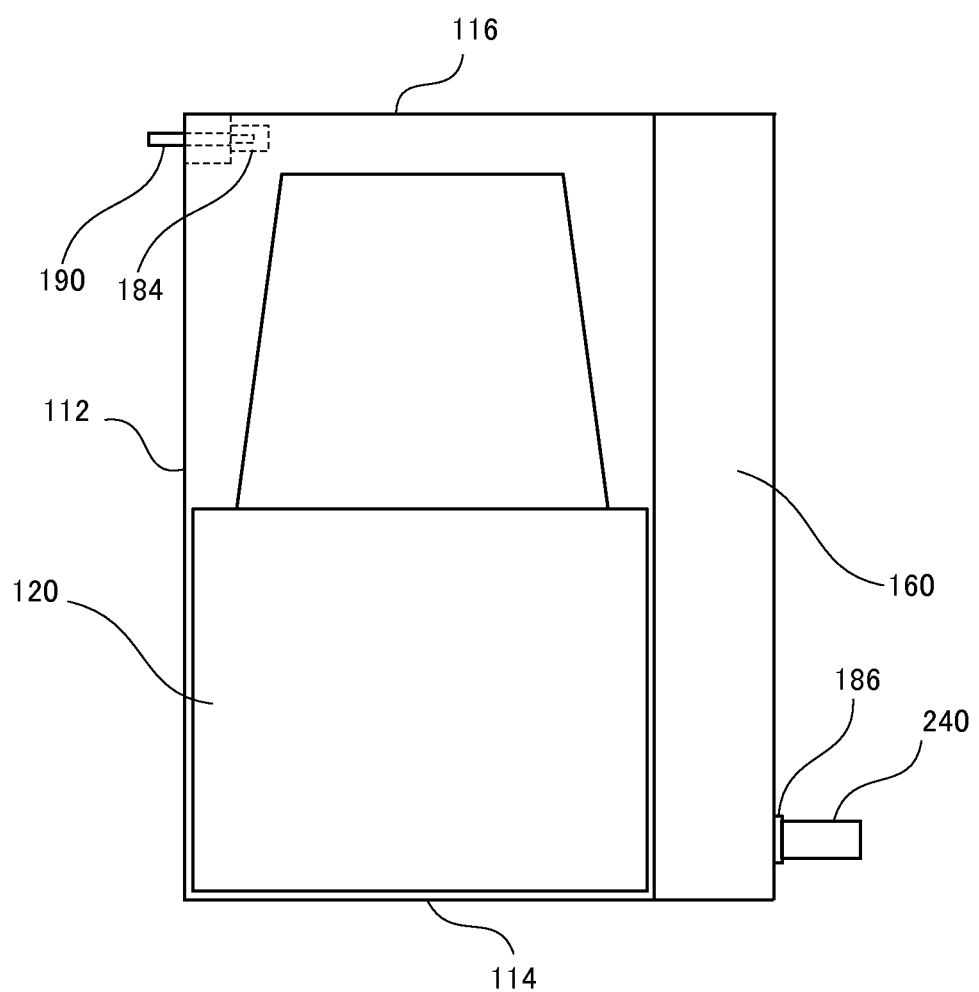
FIG. 14 is a plan view showing the USB wireless LAN adaptor and the USB memory attached to the image forming apparatus in accordance with the second embodiment of the present invention.

Back side USB socket 184 and front side USB socket 186 may be arranged at diagonal positions as shown in FIG. 14. Specifically, back side USB socket 184 may be arranged near the right side surface 116 and front side USB socket 186 may be arranged near the left side surface 114. With this arrangement, USB wireless LAN adaptor 190 attached to back side USB socket 184 is away from the dominant hand of a left-handed user. Therefore, the possibility that USB wireless LAN adaptor 190 attached to back side USB socket 184 is erroneously pulled out or damaged is further decreased. On the other hand, the USB memory attached to front side USB socket 186 is positioned near the dominant hand of a left-handed user. Therefore, the left-handed user can more easily attach/detach the USB memory while he/she is standing in front of operation unit 160.

Figure 15:
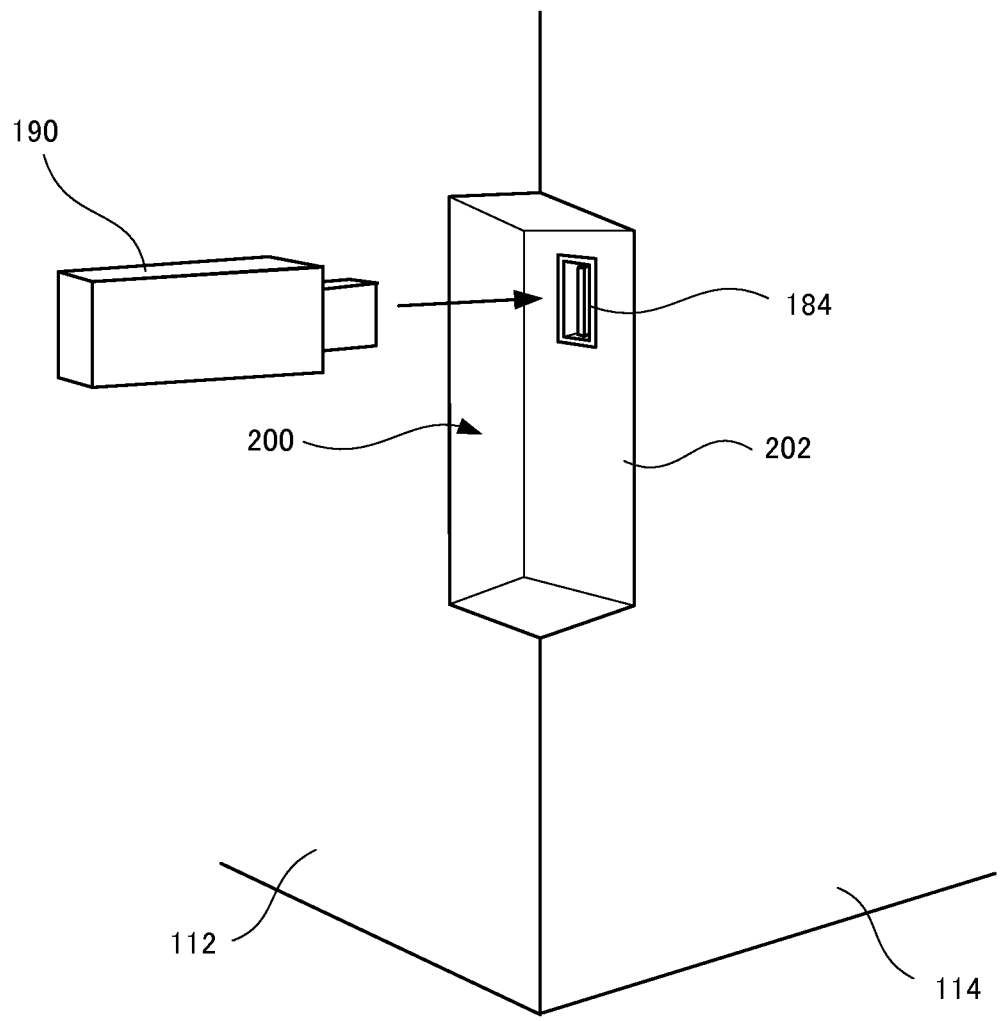
FIG. 15 is a perspective view showing an example of the recessed portion formed on the back surface of the image forming apparatus in accordance with the second embodiment of the present invention.
Figure 16:
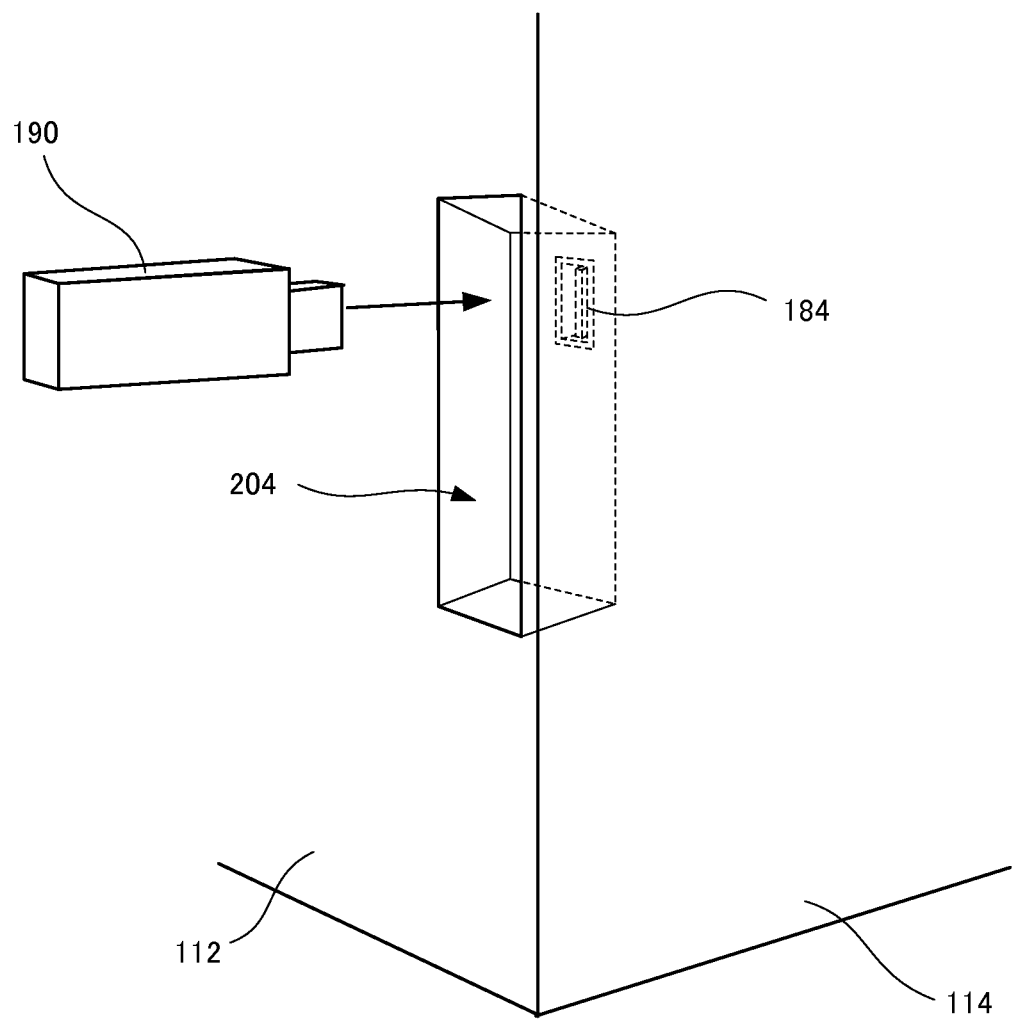
FIG. 16 is a perspective view showing an example, different from the one shown in FIG. 15, of the recessed portion formed on the back surface of the image forming apparatus in accordance with the second embodiment of the present invention.

Back side USB socket 184 may be arranged at a bottom surface 202 of recessed portion 200 formed at a corner formed by back surface 112 and left side surface 114, as shown in FIG. 15. The position where the recessed portion is formed is not limited to the corner formed by back surface 112 and left side surface 114. The recessed portion may be formed on at least one of the left side peripheral edge portion and the right side peripheral edge portion of back surface 112. The "left side peripheral edge portion" of back surface 112 means the corner formed by back surface 112 and left side surface 114 as well as a back surface portion near the left side surface 114. The "right side peripheral edge portion" of back surface 112 means the corner formed by back surface 112 and right side surface 116 as well as a back surface portion near the right side surface 116. By way of example, back side USB socket 184 may be arranged in recessed portion 204 formed on back surface 112 near left side surface 114. In FIG. 16, left side surface 114 forms a sidewall of recessed portion 204.

By arranging back side USB socket 184 in a recess as described above, the possibility that USB wireless LAN adaptor 190 is erroneously pulled out by the user or damaged can further be decreased. On the other hand, USB memory 240 attached to front side USB socket 186 is arranged on a flat portion of the front surface and, therefore, it is possible for the user to easily attach/detach USB memory 240 while he/she is standing in front of operation unit 160.

Figure 17:
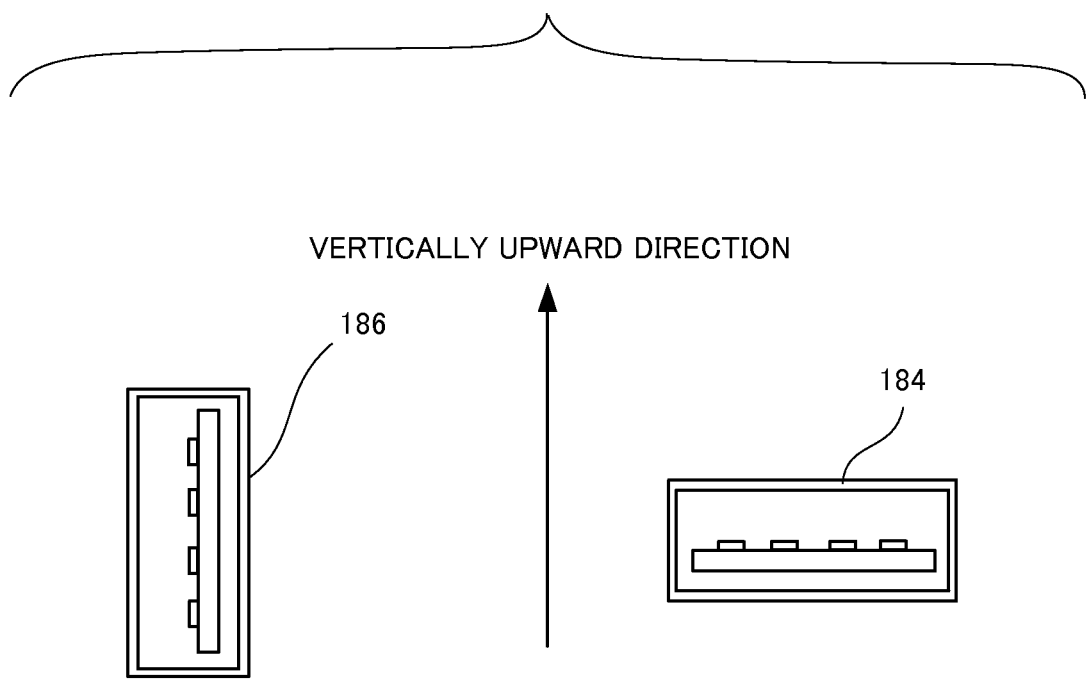
FIG. 17 is a front view showing the directions, different from those of FIG. 13, of arranging the front side USB socket and the back side USB socket of the image forming apparatus in accordance with the second embodiment of the present invention.

Orientations of front side USB socket 186 and back side USB socket 184 are not limited to those shown in FIG. 13. As shown in FIG. 17, in image forming apparatus 102, front side USB socket 186 may be arranged with the longer side of rectangle extending along the vertical direction (direction of gravitational force) and back side USB socket 184 may be arranged with the longer side of rectangle extending along the horizontal direction (direction perpendicular to the direction of gravitational force). In this case also, since back side USB socket 184 and front side USB socket 186 are arranged in different directions, it becomes easier to distinguish USB devices to be connected from each other, and the possibility of erroneously attaching USB wireless LAN adaptor 190 to front side USB socket 186 can be reduced.

Third Embodiment

Figure 18:
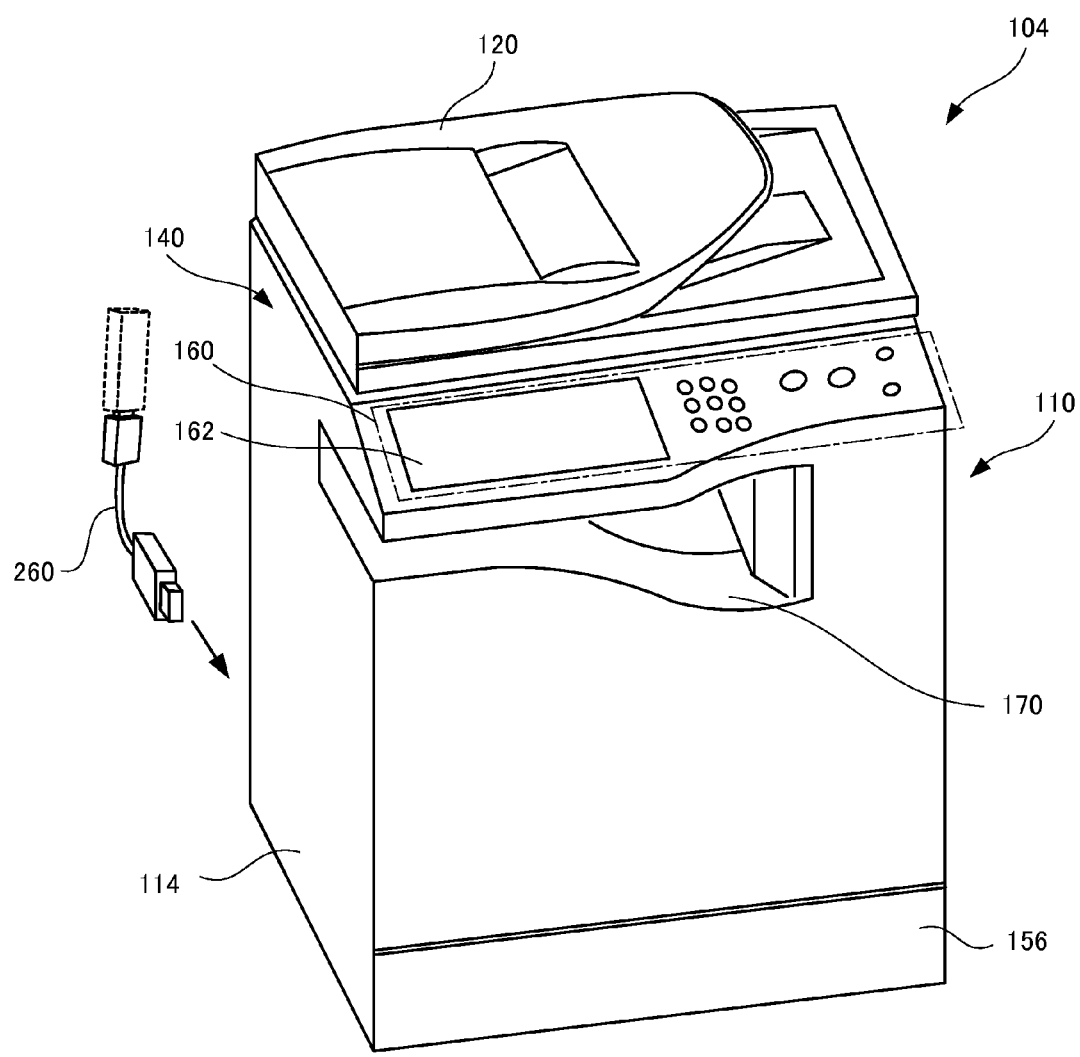
FIG. 18 is a perspective view showing an image forming apparatus in accordance with a third embodiment of the present invention.
Figure 19:
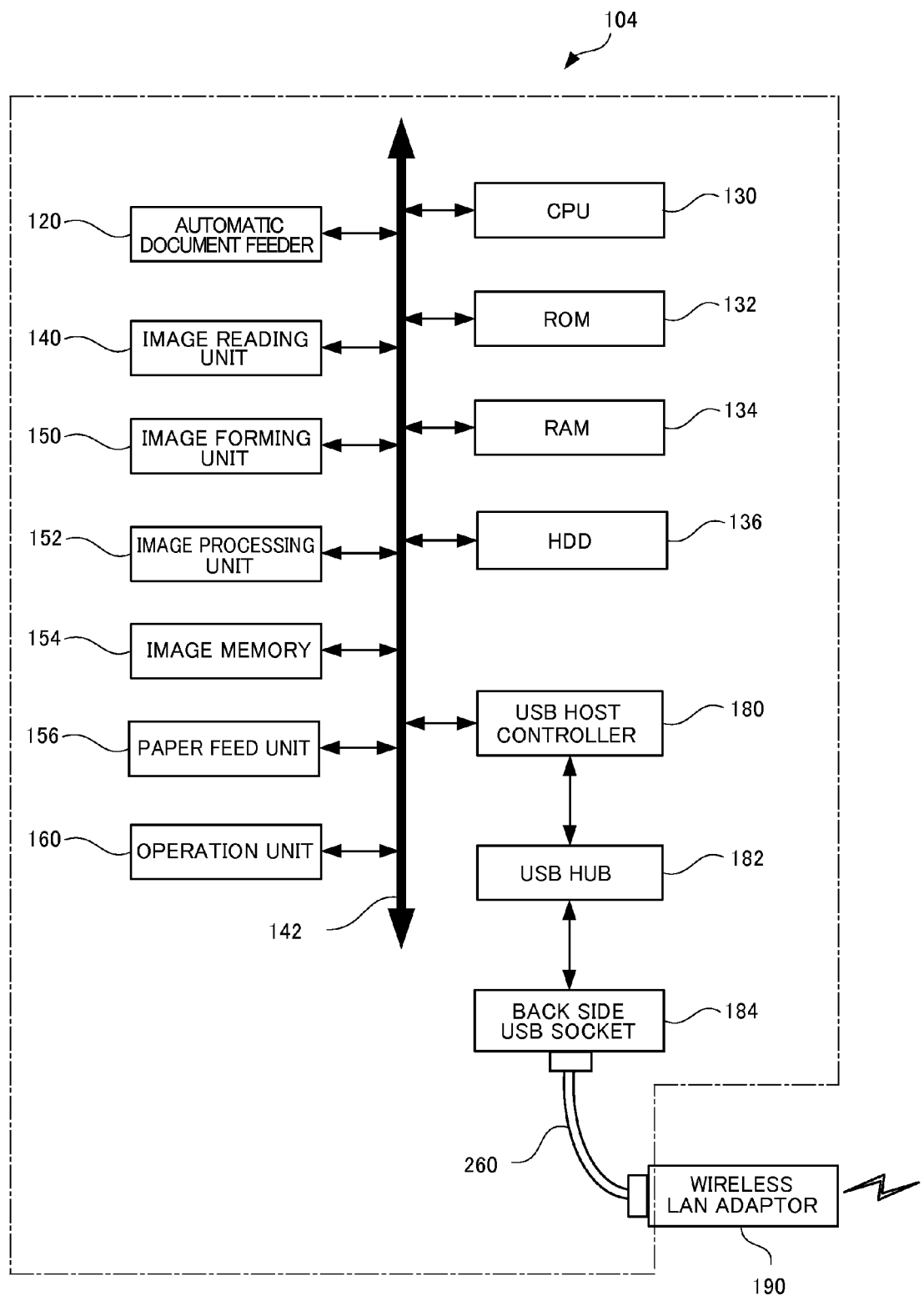
FIG. 19 is a block diagram showing a schematic configuration of the image forming apparatus in accordance with the third embodiment of the present invention.

Referring to FIGS. 18 and 19, an image forming apparatus 104 in accordance with a third embodiment of the present invention forms a multi-colored or monochrome image on a prescribed sheet of recording paper in accordance with image data formed by reading a document. Image forming apparatus 104 consists of an apparatus main body 110 and an automatic document feeder 120.

Apparatus main body 110 and automatic document feeder 120 are configured in the similar manner as in the first embodiment, and have similar functions. Image forming apparatus 104 of the third embodiment differs from image forming apparatus 100 in accordance with the first embodiment in that USB wireless LAN adaptor 190 is attached to USB socket 184 through a flexible cable 260.

Figure 20:
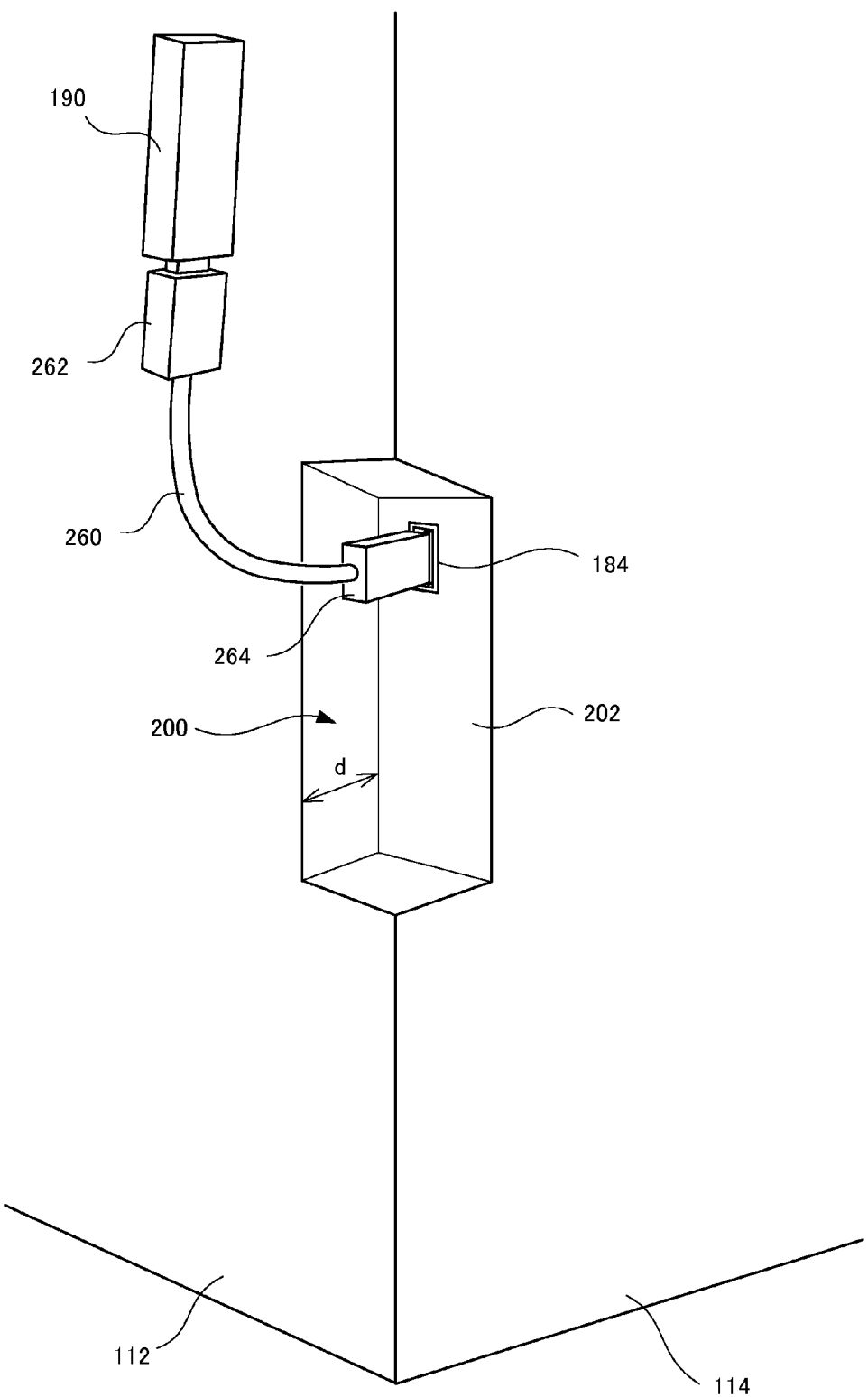
FIG. 20 is a perspective view showing a USB wireless LAN adaptor and a flexible cable attached to the image forming apparatus in accordance with the third embodiment of the present invention.

Referring to FIG. 20, flexible cable 260 has a first connector 262 at one end, to which a USB socket is arranged, and a second connector 264 at the other end, to which a USB plug is arranged. The USB plug of USB wireless LAN adaptor 190 is connected to the USB socket at the first connector 262, and the USB plug of the second connector 264 is connected to USB socket 184. Both USB socket 184 and the USB socket of the first connector 262 are sockets to which a known series A plug (USB plug of second connector 264) is connected. The depth d of recessed portion 200 formed at the corner formed by back surface 112 and left side surface 114 of apparatus main body 110 is such a depth that substantially the second connector 264 is fully accommodated in recessed portion 200 when the second connector 264 of flexible cable 260 is attached to USB socket 184.

Figure 21:
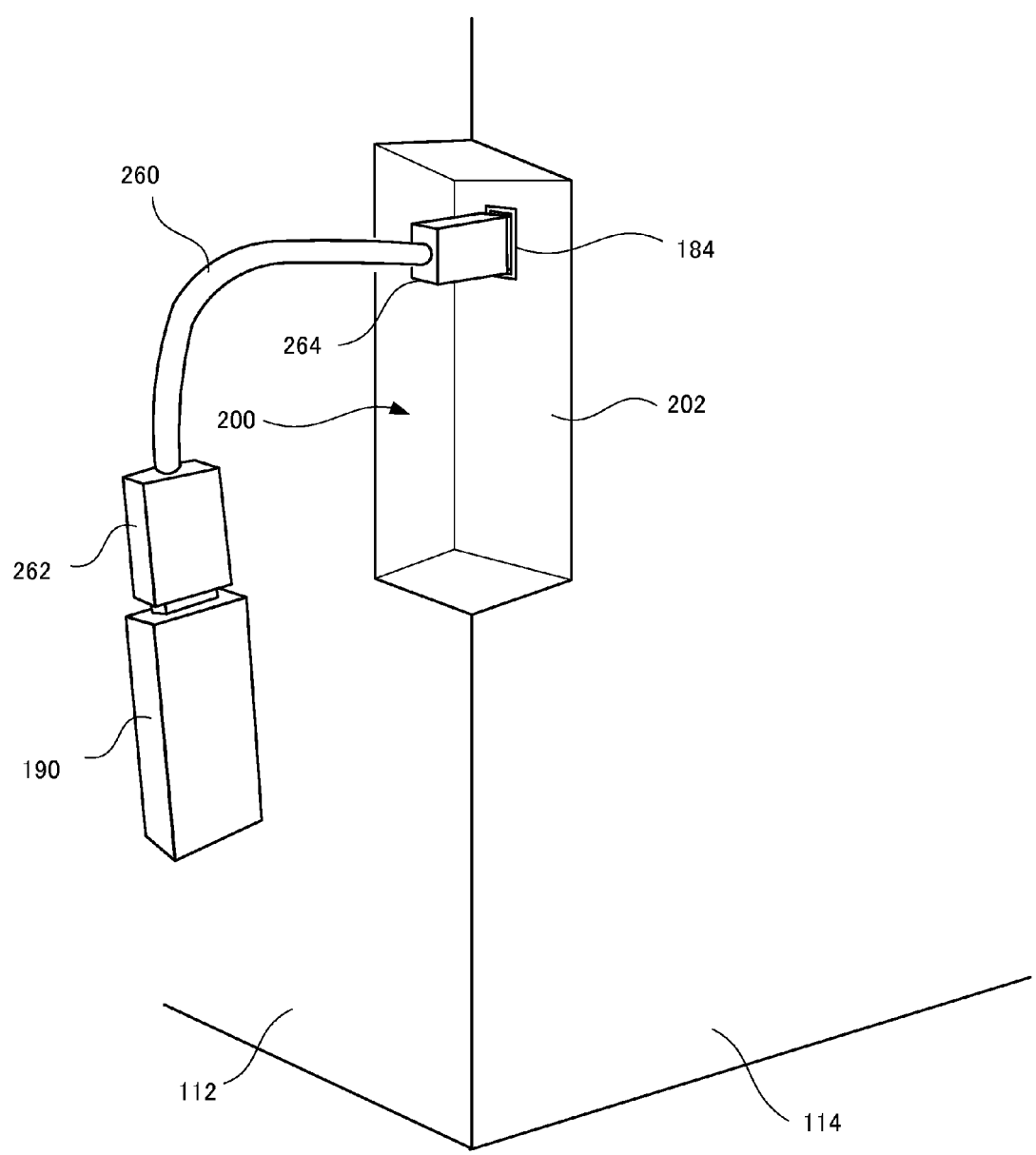
FIG. 21 is a perspective view showing the flexible cable bent downward.

Flexible cable 260 is a known USB cable of 5 mm in diameter and about 100 mm to 200 mm in length. Flexible cable 260 has a mesh shield of metal, under a resin sheath (cover) formed, for example, of vinyl or polyethylene. Since flexible cable 260 is relatively short and has the mesh shield, it can be kept in a bent shape even when USB wireless LAN adaptor 190 is connected thereto. Flexible cable 260 can keep such a bent shape as shown in FIGS. 20 and 21, not deformed by the weight of USB wireless LAN adaptor 190 and the weight of flexible cable 260 itself. Flexible cable 260 may be a cable not provided with the mesh shield.

As described above, since USB wireless LAN adaptor 190 is connected to USB socket 184 through flexible cable 260, the possibility that USB wireless LAN adaptor 190 attached to USB socket 184 is erroneously pulled out or damaged becomes very low. By way of example, assume that image forming apparatus 104 is installed with its back surface 112 positioned close to a wall. If image forming apparatus 104 is pushed by some reason (for example, to adjust the position of installation of image forming apparatus 104) and USB wireless LAN adaptor 190 should touch the wall, flexible cable 260 absorbs the shock of contact and, therefore, the possibility that USB wireless LAN adaptor 190 or USB socket 184 is damaged is very low. Since the second connector 264 is substantially fully accommodated in the recessed portion, the possibility that the connection portion between USB socket 184 and the second connector 264 is damaged is also very low.

Flexible cable 260 maintains the bent shape against weak force (the force approximately corresponding to the weight of USB wireless LAN adaptor 190 and the weight of flexible cable 260 itself), while bent shape of flexible cable 260 can easily be deformed manually. Therefore, the position of USB wireless LAN adaptor 190 can be adjusted in view of the situation of the place of installation near back surface 112. For instance, the bent shape of flexible cable 260 may be changed so that USB wireless LAN adaptor 190 may not contact some object near the back surface 112. If radio wave condition of wireless communication is bad and wireless communication is impossible or communication at a prescribed data transfer rate is impossible, the bent shape of flexible cable 260 may be changed to adjust the position and orientation of USB wireless LAN adaptor 190. If USB wireless LAN adaptor 194 having indicator unit 192 for indicating the communicating state such as shown in FIG. 6 is attached, it is possible to change the bent shape of flexible cable 260 to facilitate visual recognition of indicator unit 192.

As shown in FIGS. 20 and 21, when USB wireless LAN adaptor 190 is attached to USB socket 184 on back surface 112 through flexible cable 260, as in the first embodiment, CPU 130 controls USB host controller 180 and obtains necessary information (USB descriptor) from USB wireless LAN adaptor 190. CPU 130 loads a necessary device driver based on the obtained information, so that USB wireless LAN adaptor 190 is set to a usable state. Communication for obtaining prescribed information from USB wireless LAN adaptor 190 is executed in accordance with known USB standard. Thus, image forming apparatus 104 becomes connectable to a network through USB wireless LAN adaptor 190.

For image forming apparatus 104 to actually access a network by wireless communication through USB wireless LAN adaptor 190, it is necessary to connect to a prescribed connection destination (a router, an access point or the like). It is possible for the user (including an administrator, a service person and the like) to designate the connection destination by directly inputting an IP address of the destination through operation unit 160. Alternatively, image forming apparatus 104 may automatically detect connectable destinations and display the detected destinations in the form of a list on operation panel 162, and the user may select one from the list.

By USB wireless LAN adaptor 190, it becomes possible for image forming apparatus 104 to realize the function of receiving and printing image data from an external terminal such as an external PC, the function of transmitting image data obtained by scanning a document attached to an electronic mail, and the function of FTP-transferring image data to a computer server or the like.

Figure 22:
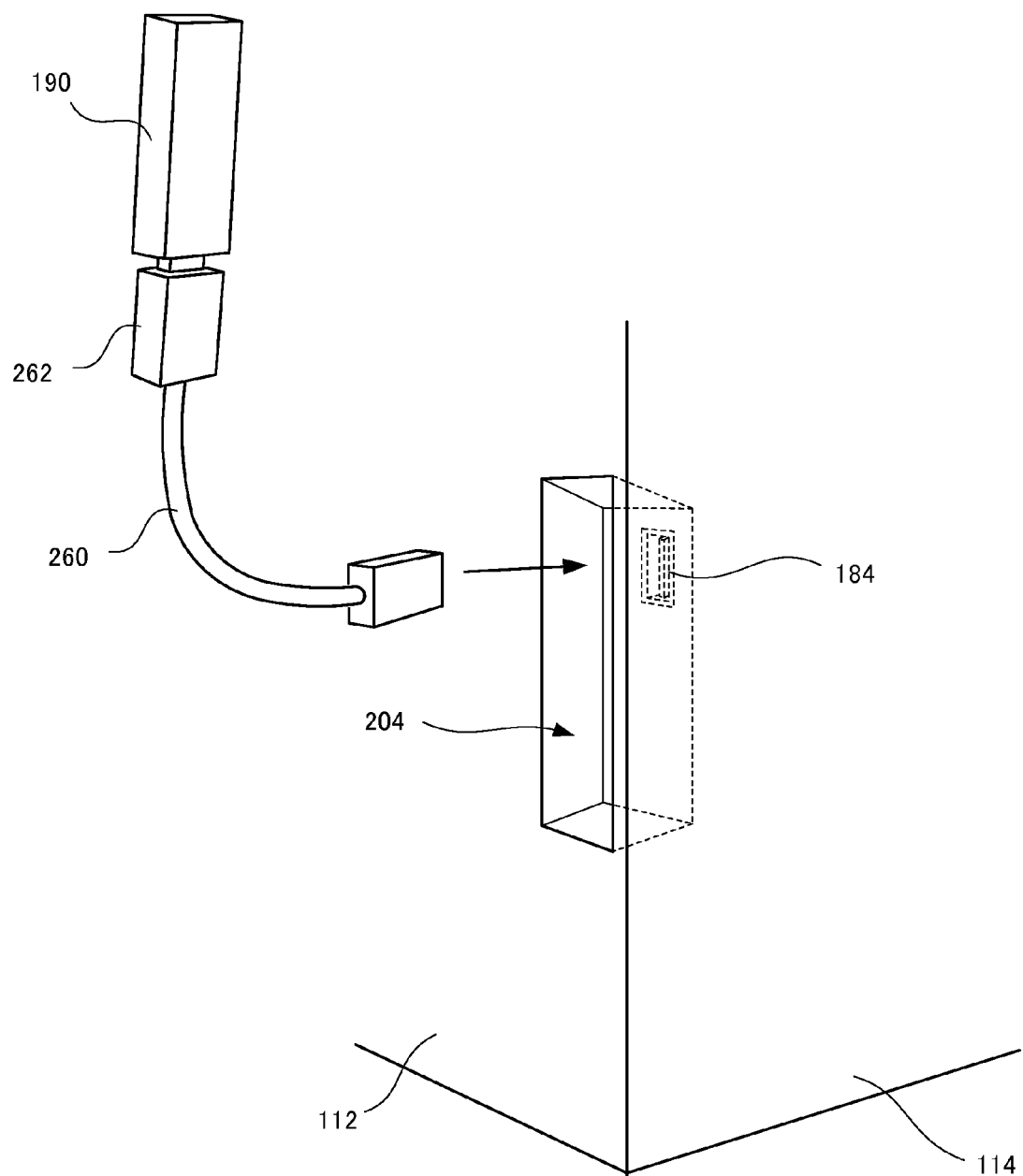
FIG. 22 is a perspective view showing an example, different from the one shown in FIG. 20, of the recessed portion formed on the back surface of the image forming apparatus in accordance with the third embodiment of the present invention.

Though an example in which USB socket 184 is arranged in recessed portion 200 formed at a corner formed by back surface 112 and side surface 114 has been described, it is not limiting. The recessed portion may be formed on at least one of the left side peripheral edge portion and the right side peripheral edge portion of back surface 112. The "left side peripheral edge portion" of back surface 112 means the corner formed by back surface 112 and left side surface 114 as well as a back surface portion near the left side surface 114. The "right side peripheral edge portion" of back surface 112 means the corner formed by back surface 112 and a right side surface as well as a back surface portion near the right side surface. By way of example, USB socket 184 may be arranged in a recessed portion 204 formed at the back surface portion near left side surface 114, as shown in FIG. 22. In FIG. 22, left side surface 114 forms a sidewall of recessed portion 204.

Though it is preferred that USB socket 184 is positioned in the recessed portion as described above, the recessed portion may not be formed and the socket may be arranged on a flat portion of back surface 112. Even in that cast, the effects of flexible cable 260 described above can be attained.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image forming apparatus, comprising:
an apparatus body;
an operation section provided on a front side of said apparatus body, receiving an instruction;
a first connecting section arranged on said front side of said apparatus body; and
a second connecting section arranged on a back side of said apparatus body; wherein said second connecting section is arranged at a position lower than said first connecting section;
said second connecting section is arranged at a corner positioned on a right end or left end of said back side, and opened at least in a direction to a back surface and in a direction to a side surface of said apparatus body;
said first connecting section and said second connecting section are arranged on left and right sides of the center of said apparatus body when viewed from a front of said apparatus body;
a detachable storage medium can be attached to said first connecting section; and
an external device can be attached to said second connecting section;
said apparatus body includes
a reading unit reading a document and generating image data,
an image forming unit forming said image on a sheet of recording paper, arranged below said reading unit,
a paper discharge tray to which the sheet of recording paper having thereon the image formed by said image forming unit, arranged in a space between said reading unit and said image forming unit,
a first open area formed at part of said front side allowing picking-up of said sheet of recording paper discharged to said discharge tray, and
a closed area other than said first open area, positioned on the right or left side of said first open area on said front side; and
said first connecting section of said closed area is arranged at a position higher than an end on the front side of said apparatus body of an upper surface of said paper discharge tray.

2. The image forming apparatus according to claim 1, wherein
said first connecting section is arranged on a right side of said front side when viewed from the front of said apparatus body; and
said second connecting section is arranged on a left side of said back side when viewed from said front.

3. The image forming apparatus according to claim 1, wherein
said first connecting section is arranged on a flat surface of said front side.

4. The image forming apparatus according to claim 1, wherein
said first connecting section has a rectangular opening to which said storage medium is connected;
said second connecting section has a rectangular opening to which said external device is connected; and
said first and second connecting sections are arranged such that longer sides of one of said two rectangular openings extend horizontally and longer sides of the other extend vertically.

5. The image forming apparatus according to claim 4, wherein
said first connecting section is arranged such that longer sides of said rectangular opening extend along the horizontal direction orthogonal to the direction of gravity; and
said second connecting section is arranged such that longer sides of said rectangular opening extend along the vertical direction parallel to the direction of gravity.

6. The image forming apparatus according to claim 1, wherein
direction of connection of said storage medium to said first connecting section and direction of connection of said external device to said second connecting section are both toward the inside of said apparatus body.

7. The image forming apparatus according to claim 1, wherein said second connecting section is arranged at a position lower than the upper surface of said paper discharge tray.

8. The image forming apparatus according to claim 1, wherein said first connecting section is arranged at the same height as said reading unit.

9. The image forming apparatus according to claim 1, further comprising a host controller for controlling said external device; wherein
said external device connected to said second connecting section is controlled by said host controller.

10. The image forming apparatus according to claim 1, wherein said first and second connecting sections are USB sockets.

11. The image forming apparatus according to claim 1, wherein said first connecting section is arranged at said closed area and at a position higher than an upper side end of said first open area.

12. The image forming apparatus according to claim 1, wherein said first connecting section is arranged at said closed area and at a position higher than a bottom surface of said operation section.

13. The image forming apparatus according to claim 1, wherein said closed area is provided on a right side of the front side of said apparatus body; and
a second open area continuous from said first open area is provided on a left side surface of said apparatus body.

14. An image forming apparatus, comprising:
an apparatus body;
an operation section provided on a front side of said apparatus body, receiving an instruction;
a first connecting section arranged on said front side of said apparatus body; and
a second connecting section arranged on a back side of said apparatus body; wherein
said second connecting section is arranged at a position lower than said first connecting section;
said second connecting section is arranged in a recessed portion formed on said back side;
said recessed portion is formed of a bottom surface parallel to the back side of said apparatus body, and a plurality of flat surfaces connected to an outer perimeter of said bottom surface and forming an opening, said second connecting section being arranged on said bottom surface;
said opening of said recessed portion extends in its longitudinal direction along height direction of said apparatus body;
said first connecting section and said second connecting section are arranged on left and right sides of the center of said apparatus body when viewed from a front of said apparatus body;
a detachable storage medium can be attached to said first connecting section;
an external device can be attached to said second connecting section;
said apparatus body includes
a reading unit reading a document and generating image data,
an image forming unit forming said image on a sheet of recording paper, arranged below said reading unit,
a paper discharge tray to which the sheet of recording paper having thereon the image formed by said image forming unit, arranged in a space between said reading unit and said image forming unit, a first open area formed at part of said front side allowing picking-up of said sheet of recording paper discharged to said discharge tray, and a closed area other than said first open area, positioned on the right or left side of said first open area on said front side; and said first connecting section of said closed area is arranged at a position higher than an end on the front side of said apparatus body of an upper surface of said paper discharge tray.

15. The image forming apparatus according to claim 14, wherein said first connecting section is arranged on a right side of said front side when viewed from the front of said apparatus body; and said second connecting section is arranged on a left side of said back side when viewed from said front.

16. The image forming apparatus according to claim 14, wherein said first connecting section is arranged on a flat surface of said front side.

17. The image forming apparatus according to claim 14, wherein said first connecting section has a rectangular opening to which said storage medium is connected;

said second connecting section has a rectangular opening to which said external device is connected; and said first and second connecting sections are arranged such that longer sides of one of said two rectangular openings extend horizontally and longer sides of the other extend vertically.

18. The image forming apparatus according to claim 17, wherein said first connecting section is arranged such that longer sides of said rectangular opening extend along the horizontal direction orthogonal to the direction of gravity; and said second connecting section is arranged such that longer sides of said rectangular opening extend along the vertical direction parallel to the direction of gravity.

19. The image forming apparatus according to claim 14, wherein direction of connection of said storage medium to said first connecting section and direction of connection of said external device to said second connecting section are both toward the inside of said apparatus body.

20. The image forming apparatus according to claim 14, wherein said second connecting section is arranged at a position lower than the upper surface of said paper discharge tray.

21. The image forming apparatus according to claim 14, wherein said first connecting section is arranged at the same height as said reading unit.

22. The image forming apparatus according to claim 14, further comprising a host controller for controlling said external device; wherein said external device connected to said second connecting section is controlled by said host controller.

23. The image forming apparatus according to claim 14, wherein said first and second connecting sections are USB sockets.

24. The image forming apparatus according to claim 14, wherein said first connecting section is arranged at said closed area and at a position higher than an upper side end of said first open area.

25. The image forming apparatus according to claim 14, wherein said first connecting section is arranged at said closed area and at a position higher than a bottom surface of said operation section.

26. The image forming apparatus according to claim 14, wherein said closed area is provided on a right side of the front side of said apparatus body; and a second open area continuous from said first open area is provided on a left side surface of said apparatus body.

* * * * *